(12) United States Patent
Cai et al.

(10) Patent No.: US 12,552,558 B2
(45) Date of Patent: Feb. 17, 2026

(54) MULTI-MONOCOPTER SYSTEM AND METHOD OF OPERATING THEREOF

(71) Applicant: Singapore University of Technology and Design, Singapore (SG)

(72) Inventors: Xinyu Cai, Singapore (SG); Shaohui Foong, Singapore (SG); Kyi Hla Win, Singapore (SG); Luke Soe Thura Win, Singapore (SG); Danial Sufiyan Bin Shaiful, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 0 days.

(21) Appl. No.: 18/869,652

(22) PCT Filed: May 19, 2023

(86) PCT No.: PCT/SG2023/050344
§ 371 (c)(1),
(2) Date: Nov. 26, 2024

(87) PCT Pub. No.: WO2023/229526
PCT Pub. Date: Nov. 30, 2023

(65) Prior Publication Data
US 2025/0353620 A1    Nov. 20, 2025

(30) Foreign Application Priority Data
May 27, 2022   (SG) .......................... 10202250031G

(51) Int. Cl.
*B64U 10/10*    (2023.01)
*B64U 20/40*    (2023.01)
*B64U 30/14*    (2023.01)

(52) U.S. Cl.
CPC ............. *B64U 10/10* (2023.01); *B64U 20/40* (2023.01); *B64U 30/14* (2023.01); *B64U 2201/102* (2023.01)

(58) Field of Classification Search
CPC ........ B64U 10/10; B64U 20/40; B64U 30/14; B64U 2201/102; B64U 10/13; B64U 30/10; B64U 50/13
See application file for complete search history.

(56) References Cited

U.S. PATENT DOCUMENTS 1,133,660 A * 3/1915 Papin et al. ............ B64C 25/32
                                            60/39.35
1,413,316 A * 4/1922 Bradley ............... A63H 33/185
                                            446/34

(Continued)

FOREIGN PATENT DOCUMENTS

| CN | 205524962 U | 8/2016 |
|---|---|---|
| KR | 10-2018-0017464 A | 2/2018 |
| WO | 2022/010419 A1 | 1/2022 |

OTHER PUBLICATIONS

Tomic et al., "Toward a fully autonomous UAV: Research platform for indoor and outdoor urban search and rescue," IEEE robotics & automation magazine, vol. 19, No. 3, pp. 46-56, 2012.

(Continued)

*Primary Examiner* — Medhat Badawi

(57) ABSTRACT

A multi-monocopter system is provided, including a plurality of monocopters. Each monocopter includes: a flight controller, disposed on a housing member, operable to control a flight of the monocopter in an individual flight mode and a flight of the plurality of monocopters collectively in a cooperative flight mode; a wing member; a thrust unit; and a magnetic connector coupled to the housing member. The magnetic connector is configured to be connectable to corresponding magnetic connectors of other (Continued)

monocopters of the plurality of monocopters via a magnetic force to operate in the cooperative flight mode. When in the cooperative flight mode during flight, the flight controller is operable to control a rotational speed of the plurality of monocopters collectively to produce a centrifugal force that exceeds the magnetic force for separating the plurality of monocopters connected via the magnetic force to convert the cooperative flight mode to the individual flight mode.

20 Claims, 13 Drawing Sheets

(56) References Cited

U.S. PATENT DOCUMENTS

| | | | | |
|---|---|---|---|---|
| 1,651,273 | A * | 11/1927 | Heller | A63H 33/185 473/569 |
| 3,656,723 | A * | 4/1972 | Piasecki | B64D 1/22 244/2 |
| 3,743,214 | A * | 7/1973 | Maciolek | G05D 1/0858 318/584 |
| 3,744,741 | A * | 7/1973 | Christian | A63H 27/001 244/49 |
| 5,173,069 | A * | 12/1992 | Litos | A63H 33/185 473/590 |
| 5,810,636 | A * | 9/1998 | Harned | A63H 33/185 446/265 |
| 5,813,625 | A * | 9/1998 | Hassan | B64C 27/467 244/17.11 |
| 7,766,274 | B1 * | 8/2010 | Jameson | B64U 10/20 244/6 |
| 8,079,546 | B2 * | 12/2011 | Barrows | B64D 19/02 102/388 |
| 8,201,773 | B1 * | 6/2012 | Durham | B64U 10/80 244/49 |
| 8,366,055 | B2 * | 2/2013 | Ulrich | B64U 10/25 244/17.11 |
| 8,698,059 | B2 * | 4/2014 | Nikkel | F42B 10/16 244/38 |
| 8,720,822 | B2 * | 5/2014 | Vaneck | B64C 3/185 244/123.1 |
| 9,079,662 | B1 * | 7/2015 | Duffy | G05D 1/695 |
| 9,199,718 | B2 * | 12/2015 | Fogarty | A63H 33/18 |
| 9,266,609 | B1 * | 2/2016 | Kunz | B64U 30/10 |
| 9,669,842 | B2 * | 6/2017 | Matsumoto | B60W 50/045 |
| 9,950,790 | B2 * | 4/2018 | Keennon | B64C 19/00 |
| 10,118,696 | B1 * | 11/2018 | Hoffberg | B64C 21/00 |
| 10,131,429 | B2 * | 11/2018 | Zonio | B64D 1/22 |
| 10,279,891 | B2 * | 5/2019 | Krebs | G05D 1/0841 |
| 10,279,902 | B2 * | 5/2019 | Childress | B64U 70/83 |
| 10,535,265 | B2 * | 1/2020 | Park | G01S 17/931 |
| 10,676,190 | B2 * | 6/2020 | Mitchell | B64U 30/29 |
| 10,773,799 | B1 * | 9/2020 | Thrun | B64U 10/60 |
| 10,875,658 | B2 * | 12/2020 | Evulet | F02C 6/04 |
| 11,066,163 | B2 * | 7/2021 | Kimchi | B64U 50/13 |
| 11,371,355 | B2 * | 6/2022 | Govindan | F03B 3/04 |
| 11,413,756 | B2 * | 8/2022 | Dance | G05D 1/0276 |
| 11,453,492 | B2 * | 9/2022 | Low | B64U 30/12 |
| 11,480,958 | B2 * | 10/2022 | Paczan | G05D 1/0027 |
| 11,649,049 | B2 * | 5/2023 | Green | B64U 10/17 244/17.23 |
| 11,835,947 | B1 * | 12/2023 | Siegel | G01C 21/343 |
| 11,970,268 | B2 * | 4/2024 | Garanger | B64C 25/32 |
| 11,977,392 | B2 * | 5/2024 | Bukhari | G06N 3/08 |
| 11,981,433 | B2 * | 5/2024 | Schütz | G05D 1/104 |
| 12,038,746 | B2 * | 7/2024 | Hajimiri | G05D 1/00 |
| 12,103,705 | B2 * | 10/2024 | Trenshaw | A62C 3/0228 |
| 12,151,834 | B2 * | 11/2024 | Win | B64U 20/80 |
| 12,202,612 | B2 * | 1/2025 | Win | F42B 10/56 |
| 12,338,008 | B2 * | 6/2025 | Win | B64U 20/50 |
| 12,434,822 | B2 * | 10/2025 | Ifill | G05D 1/105 |
| 2009/0299551 | A1 * | 12/2009 | So | G05D 1/104 701/3 |
| 2010/0178167 | A1 * | 7/2010 | Janker | B64C 27/615 416/31 |
| 2010/0324754 | A1 * | 12/2010 | Barrows | B64D 19/02 701/3 |
| 2012/0328441 | A1 * | 12/2012 | Fogarty | A63H 33/18 416/204 R |
| 2014/0312164 | A1 * | 10/2014 | Gibson | B64U 80/60 244/17.11 |
| 2016/0046387 | A1 * | 2/2016 | Frolov | G08G 5/55 244/59 |
| 2017/0269612 | A1 * | 9/2017 | Frolov | G01P 5/165 |
| 2019/0061934 | A1 * | 2/2019 | Kawiecki | B64U 30/297 |
| 2019/0382104 | A1 * | 12/2019 | Low | B64C 27/22 |
| 2019/0391575 | A1 * | 12/2019 | Hortner | G08G 5/53 |
| 2020/0055585 | A1 * | 2/2020 | Hung | B64C 9/12 |
| 2021/0253235 | A1 * | 8/2021 | Solstin | B64U 50/19 |
| 2021/0291979 | A1 * | 9/2021 | Cattano | F03D 5/04 |
| 2022/0063841 | A1 * | 3/2022 | Selfridge | B64U 30/20 |
| 2022/0212779 | A1 * | 7/2022 | Randall | B64C 5/12 |
| 2023/0296781 | A1 * | 9/2023 | Foong | G01S 7/4817 356/4.01 |
| 2023/0312142 | A1 * | 10/2023 | Win | B64U 30/10 244/6 |
| 2023/0348075 | A1 * | 11/2023 | Win | F42B 10/56 |
| 2023/0356836 | A1 * | 11/2023 | Von Bertouch | B64C 29/0016 |
| 2023/0406551 | A1 * | 12/2023 | Dao | B64U 10/13 |
| 2024/0239529 | A1 * | 7/2024 | Pheh | B64U 30/299 |
| 2024/0262530 | A1 * | 8/2024 | Chantrill | B64C 1/063 |
| 2024/0262541 | A1 * | 8/2024 | Win et al. | B64U 10/13 |
| 2024/0327042 | A1 * | 10/2024 | Foong | B64U 50/34 |
| 2025/0322754 | A1 * | 10/2025 | Sakaguchi | G08G 5/26 |

OTHER PUBLICATIONS

Chen et al., "Using a quadrotor to track a moving target with arbitrary relative motion patterns," in 2017 IEEE/RSJ International Conference on Intelligent Robots and Systems (IROS). IEEE, 2017, pp. 5310-5317.

Özaslan et al., "Autonomous navigation and mapping for inspection of penstocks and tunnels with MAVs," IEEE Robotics and Automation Letters, vol. 2, No. 3, pp. 1740-1747, 2017.

Fraundorfer et al., "Vision-based autonomous mapping and exploration using a quadrotor MAV," 2012 IEEE/RSJ International Conference on Intelligent Robots and Systems. IEEE, 2012, pp. 4557-4564.

McGuire et al. "Minimal navigation solution for a swarm of tiny flying robots to explore an unknown environment," Science Robotics, vol. 4, No. 35, 2019.

Xie et al., "Towards cooperative transport of a suspended payload via two aerial robots with inertial sensing," 2020 IEEE/RSJ International Conference on Intelligent Robots and Systems (IROS). IEEE, 2020, pp. 1215-1221.

Yao et al., "A reconfiguration strategy for modular robots using origami folding," The International Journal of Robotics Research, vol. 38, No. 1, pp. 73-89, 2019.

Bai et al, "SplitFlyer: a modular quadcoptor that disassembles into two flying robots," 2020 IEEE/RSJ International Conference on Intelligent Robots and Systems (IROS). IEEE, 2020, pp. 1207-1214.

Saldana et al., "ModQuad: The flying modular structure that self-assembles in midair," 2018 IEEE International Conference on Robotics and Automation (ICRA). IEEE, 2018, pp. 691-698.

Anzai et al., "Design, modeling and control of fully actuated 2d transformable aerial robot with 1 DoF thrust vectorable link module," 2019 IEEE/RSJ International Conference on Intelligent Robots and Systems (IROS). IEEE, 2019, pp. 2820-2826.

Win et al., "An agile samara-inspired single-actuator aerial robot capable of autorotation and diving," IEEE Transactions on Robotics, 2021.

Lentink et al., "Leading-edge vortices elevate lift of autorotating plant seeds," Science, vol. 324, No. 5933, pp. 1438-1440, 2009.

Tan et al., "Flydar: Magnetometer-based high angular rate estimation during gyro saturation for SLAM," 2020 IEEE International Conference on Robotics and Automation (ICRA). IEEE, 2020, pp. 8532-8537.

(56) References Cited

OTHER PUBLICATIONS

Norberg, "Autorotation, self-stability, and structure of single-winged fruits and seeds (samaras) with comparative remarks on animal flight," Biological Reviews, vol. 48, No. 4, pp. 561-596, 1973.

Sufiyan et al., "Joint mechanical design and flight control optimization of a nature-inspired unmanned aerial vehicle via collaborative co-evolution," IEEE Robotics and Automation Letters, vol. 6, No. 2, pp. 2044-2051, 2021.

Ulrich et al., "From falling to flying: the path to powered flight of a robotic samara nano air vehicle," Bioinspiration & biomimetics, vol. 5, No. 4, p. 045009, 2010.

Zhang et al., "A controllable flying vehicle with a single moving part," 2016 IEEE International Conference on Robotics and Automation (ICRA). IEEE, 2016, pp. 3275-3281.

Zhao et al., "Design, modeling, and control of an aerial robot dragon: A dual-rotor-embedded multilink robot with the ability of multi-degree-of-freedom aerial transformation," IEEE Robotics and Automation Letters, vol. 3, No. 2, pp. 1176-1183, 2018.

Paulos et al., "Automated self-assembly of large maritime structures by a team of robotic boats," IEEE Transactions on Automation Science and Engineering, vol. 12, No. 3, pp. 958-968, 2015.

Daudelin et al., "An integrated system for perception-driven autonomy with modular robots," Science Robotics, vol. 3, No. 23, 2018.

Low et al., "Design and dynamic analysis of a Transformable HOvering Rotorcraft (THOR)," 2017 IEEE International Conference on Robotics and Automation (ICRA). IEEE, 2017, pp. 6389-6396.

Mueller et al., "Relaxed hover solutions for multicopters: Application to algorithmic redundancy and novel vehicles," The International Journal of Robotics Research, vol. 35, No. 8, pp. 873-889, 2016.

Semat et al., "Physics, chapter 11: Rotational motion (the dynamics of a rigid body)," Robert Katz Publications, p. 141, 1958.

Crandall, "The effect of damping on the stability of gyroscopic pendulums," Theoretical, Experimental, and Numerical Contributions to the Mechanics of Fluids and Solids. Springer, 1995, pp. 761-780.

Piccoli et al., "Passive stability of a single actuator micro aerial vehicle," 2014 IEEE International Conference on Robotics and Automation (ICRA). IEEE, 2014, pp. 5510-5515.

Paulos et al., "Flight performance of a swashplateless micro air vehicle," 2015 IEEE International Conference on Robotics and Automation (ICRA). IEEE, 2015, pp. 5284-5289.

Win et al., "Dynamics and Control of a Collaborative and Separating Descent of Samara Autorotating Wings", IEEE Robotics and Automation Letters, Jul. 1, 2019, vol. 4, No. 3, pp. 3067-3074.

\* cited by examiner

Singular mode

Cooperative mode (n=2)

TABLE I
RMSE OF POSITION FROM 5 FLIGHTS

| Item | | x-axis(m) | y-axis(m) | z-axis(m) |
|---|---|---|---|---|
| Singular mode | Hovering | 0.1630 | 0.1349 | 0.0763 |
| | Tracking | 0.3520 | 0.3178 | 0.0765 |
| Cooperative mode | Hovering | 0.2934 | 0.2663 | 0.0402 |
| | Tracking | 0.3963 | 0.5170 | 0.1051 |

MULTI-MONOCOPTER SYSTEM AND METHOD OF OPERATING THEREOF

CROSS-REFERENCE TO RELATED APPLICATION

This application is a U.S. National Stage of PCT/SG2023/050344, filed on May 19, 2023, which claims the benefit of priority of Singapore Patent Application No. 10202250031G, filed on May 27, 2022, the contents of which are herein incorporated by reference in their entireties for all purposes. To the extent appropriate, a claim of priority is made to each of the above disclosed applications.

TECHNICAL FIELD

The present invention generally relates to a multi-monocopter system, a method of operating the multi-monocopter system and a method of forming a monocopter for the multi-monocopter system, and more particularly, a multi-monocopter system that is capable of operating cooperatively in a cooperative flight mode and operating individually in an individual flight mode.

BACKGROUND

In recent decades, aerial robots have attracted tremendous attention from the world owing to their wide application and foreseeable potential in many fields such as search, tracking, inspection and mapping. To broaden their applications, swarm behavior, cooperation, reconfiguration, modular design and transformable ability have been employed. In this way, a single robot with limited capacity/capability can become competent to a complex task by cooperating with others and transforming into an appropriate mode. Among them, monocopters, generating lift force by revolving its own body, are believed to have some particular advantages in aerial deployment, hovering, and LIDAR based mapping.

A need therefore exists to provide a multi-monocopter system, as well as a method of operating thereof, that is capable of operating cooperatively in a cooperative flight mode and operating individually in an individual flight mode. It is against this background that the present invention has been developed.

SUMMARY

According to a first aspect of the present invention, there is provided a multi-monocopter system comprising:
- a plurality of monocopters operable cooperatively in a cooperative flight mode and operable individually in an individual flight mode, each monocopter comprising:
  - a housing member having disposed thereon a flight controller operable to control a flight of the monocopter in the individual flight mode and a flight of the plurality of monocopters collectively in the cooperative flight mode;
  - a wing member coupled to the housing member so as to extend from a first side thereof, the wing member being configured to produce an aerodynamic force when the monocopter is rotating;
  - a thrust unit coupled to a leading edge of the wing member and configured to generate a thrust for rotating the monocopter, wherein the flight controller is communicatively coupled to the thrust unit for controlling the thrust unit; and
  - a magnetic connector coupled to the housing member so as to extend from a second side thereof, the second side being at least substantially opposite to the first side of the housing member, the magnetic connector being configured to be connectable to one or more corresponding magnetic connectors of other one or more monocopters of the plurality of monocopters via a magnetic force to operate cooperatively in the cooperative flight mode with said other one or more monocopters,
- wherein when the plurality of monocopters are operating cooperatively in the cooperative flight mode during flight, the flight controller is operable to control a rotational speed of the plurality of monocopters collectively to produce a centrifugal force that exceed said magnetic force for separating the plurality of monocopters connected via said magnetic force so as to convert the cooperative flight mode to the individual flight mode.

According to a second aspect of the present invention, there is provided a method of operating a multi-monocopter system according to the above-mentioned first aspect of the present invention, wherein the plurality of monocopters are operating cooperatively in the cooperative flight mode, the method comprising:
- receiving, by the flight controller of each monocopter of the plurality of monocopters, a target position in a 3D space;
- determining, by the flight controller of each monocopter of the plurality of monocopters, a first position error in a first direction, a second position error in a second direction and a third position error in a third direction of the plurality of monocopters collectively in the 3D space based on the target position and a current position in the 3D space, the first and second directions being along a horizontal plane and the third direction being perpendicular to the horizontal plane;
- determining, by the translational controller of the position controller of each monocopter of the plurality of monocopters, a respective target acceleration in a target direction for the respective monocopter based on the first and second position errors;
- determining, by the altitude controller of the position controller of each monocopter of the plurality of monocopters, a respective target acceleration in the third direction for the respective monocopter based on the third position error; and
- generating, by the attitude controller of each monocopter of the plurality of monocopters, a target attitude signal for the respective monocopter based on the respective target acceleration in the target direction from the translation controller of the respective monocopter; and
- generating, by the thrust unit of each monocopter of the plurality of monocopters, the respective thrust based on the respective target attitude signal and the respective target acceleration in the third direction determined for moving the plurality of monocopters collectively.

According to a third aspect of the present invention, there is provided a method of forming a monocopter for a multi-monocopter system comprising a plurality of monocopters operable cooperatively in a cooperative flight mode and operable individually in an individual flight mode (e.g., the multi-monocopter system according to the above-mentioned first aspect of the present invention). The method comprises:
- providing or forming a housing member and disposing thereon a flight controller operable to control a flight of the monocopter in the individual flight mode and a flight of the plurality of monocopters collectively in the cooperative flight mode;

providing or forming a wing member coupled to the housing member so as to extend from a first side thereof, the wing member being configured to produce an aerodynamic force when the monocopter is rotating;

coupling a thrust unit to a leading edge of the wing member and configured to generate a thrust for rotating the monocopter, wherein the flight controller is communicatively coupled to the thrust unit for controlling the thrust unit; and providing or forming a magnetic connector coupled to the housing member so as to extend from a second side thereof, the second side being at least substantially opposite to the first side of the housing member, the magnetic connector being configured to be connectable to one or more corresponding magnetic connectors of other one or more monocopters of the plurality of monocopters via a magnetic force to operate cooperatively in the cooperative flight mode with said other one or more monocopters, wherein when the plurality of monocopters are operating cooperatively in the cooperative flight mode during flight, the flight controller is operable to control a rotational speed of the plurality of monocopters collectively to produce a centrifugal force that exceed said magnetic force for separating the plurality of monocopters connected via said magnetic force so as to convert the cooperative flight mode to the individual flight mode.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention provide a multi-monocopter system, a method of operating the multi-monocopter system and a method of forming a monocopter for the multi-monocopter system, and more particularly, a multi-monocopter system that is capable of operating cooperatively in a cooperative flight mode (which may also simply be herein referred to as a cooperative mode) and operating individually in an individual flight mode (which may also interchangeably be referred to as a singular flight mode, or simply be herein referred to as individual or singular mode).

As discussed in the background, in recent decades, aerial robots (or simple referred to as robot(s) herein) have attracted tremendous attention from the world owing to their wide application and foreseeable potential in many fields such as search, tracking, inspection and mapping. To broaden their applications, swarm behavior, cooperation, reconfiguration, modular design and transformable ability have been employed. In this way, a single robot with limited capacity/capability can become competent to a complex task by cooperating with others and transforming into an appropriate mode. Among them, monocopters, generating lift force by revolving its own body, are believed to have some particular advantages in aerial deployment, hovering, and LIDAR based mapping.

Accordingly, various embodiments of the present invention provide a multi-monocopter system, as well as a method of operating thereof, that is capable of operating cooperatively in a cooperative flight mode and operating individually in an individual flight mode. For example, as will be described later below according to various example embodiments of the present invention, each monocopter in the multi-monocopter system may be referred to as a modular single actuator monocopter (M-SAM), which is capable of flying in both singular and cooperative configurations.

Figure 1:
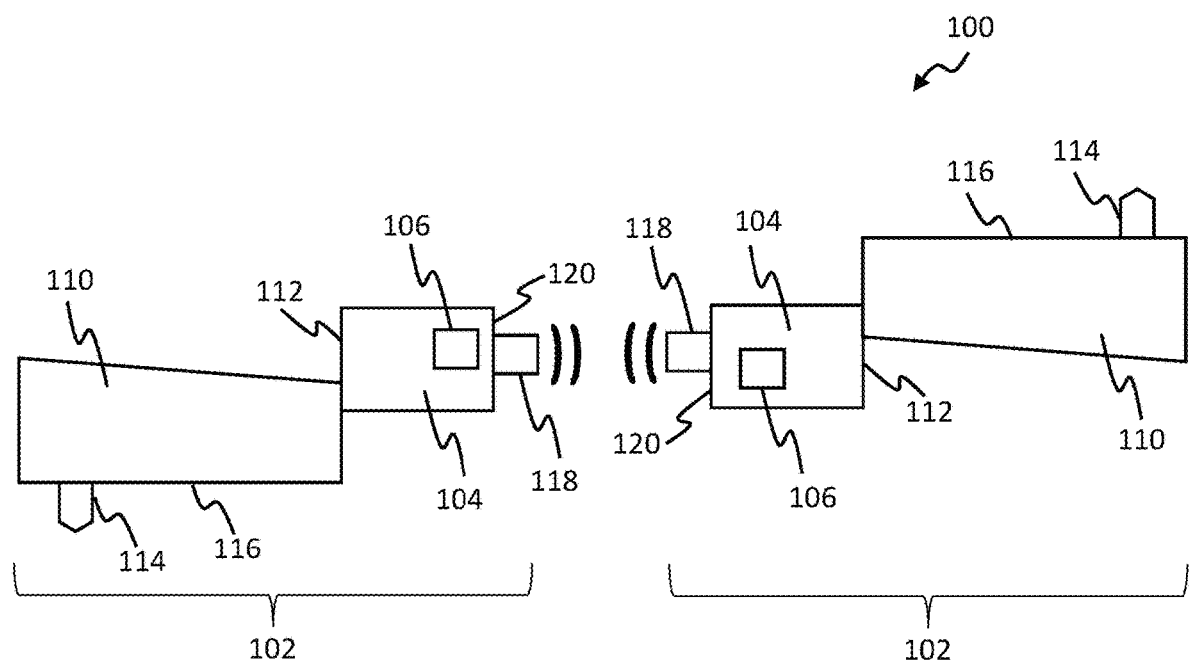
FIG. 1 depicts a schematic drawing of a multi-monocopter system, according to various embodiments of the present invention.

FIG. 1 depicts a schematic drawing of a multi-monocopter system 100 according to various embodiments of the present invention. The multi-monocopter system 100 comprises a plurality of monocopters 102 operable cooperatively in a cooperative flight mode and operable individually in an individual flight mode. For the sake of simplicity and clarity, the multi-monocopter system 100 is shown in FIG. 1 as having two monocopters 102. However, it will be appreciated by a person skilled in the art, and it will also be described later below according to various example embodiments, that the present invention is not limited to a multi-monocopter system 100 having only two monocopters and any number of multiple monocopters can be included in the multi-monocopter system 100 as desired or as appropriate without going beyond the scope of the present invention.

In various embodiments, each monocopter 102 (which may also be referred to as a mono-wing aerial robot or vehicle) comprises a housing member 104 having disposed thereon (thereby housing) a flight controller 106 operable to control a flight of the monocopter 102 in the individual flight mode and control a flight of the plurality of monocopters collectively in the cooperative flight mode. Each monocopter 102 further comprises a wing member 110 coupled to the housing member 104 so as to extend from a first side 112 thereof, the wing member 110 being configured to produce an aerodynamic force when the monocopter 102 is rotating; and a thrust unit 114 coupled to a leading edge 116 of the wing member 110 and configured to generate a thrust for rotating the monocopter. In this regard, the flight controller 106 is communicatively coupled to the thrust unit 114 for controlling the thrust unit 114. Each monocopter 102 further comprises a magnetic connector 118 coupled to the housing member 104 so as to extend from a second side 120 thereof, the second side 120 being at least substantially opposite to the first side 112 of the housing member 104, the magnetic connector 118 being configured to be connectable to one or more corresponding magnetic connectors 118 of other one or more monocopters 102 of the plurality of monocopters via a magnetic force to operate cooperatively in the cooperative flight mode with the above-mentioned other one or more monocopters 102. In particular, when the plurality of monocopters are operating cooperatively in the cooperative flight mode during flight, the flight controller 106 is operable to control the rotational speed of the plurality of monocopters collectively to produce a centrifugal force that exceed the above-mentioned magnetic force for separating the plurality of monocopters connected (e.g., held together) via the above-mentioned magnetic force so as to convert (or switch) the cooperative flight mode to the individual flight mode.

Accordingly, the multi-monocopter system 100 according to various embodiments of the present invention is advantageously capable of operating cooperatively in the cooperative flight mode and operating individually in the individual flight mode. In particular, each monocopter 102 advantageously comprises a magnetic connector 118 configured to be connectable to corresponding magnetic connector(s) 118 of other monocopter(s) 102 via a magnetic force to operate cooperatively in the cooperative flight mode with such other monocopter(s) 102. By connecting the plurality of monocopters to be in the cooperative flight mode via such a magnetic force provided by the magnetic connectors of the plurality of monocopters, various embodiments of the present invention is advantageously able to convert (or switch) the cooperative flight mode to the individual flight mode efficiently and effectively by controlling the rotational speed of the plurality of monocopters collectively to produce a centrifugal force that exceed the above-mentioned magnetic force for separating the plurality of monocopters that were being connected (e.g., held together) via the above-mentioned magnetic force. Accordingly, this conversion (or switching) from the cooperative flight mode to the individual flight mode can advantageously be achieved passively, that is, without using a dedicated separating actuator for separating the plurality of monocopters. In addition, for each monocopter 102, the flight controller 106 of the monocopter 102 is operable to control the flight (e.g., position and attitude) of the monocopter 102 in the individual flight mode and control the flight (e.g., position and attitude) of the plurality of monocopters collectively in the cooperative flight mode. Therefore, the multi-monocopter system 100 according to various embodiments of the present invention is advantageously capable of operating cooperatively in the cooperative flight mode and operating individually in the individual flight mode, along with enabling the cooperative flight mode to be switched to the individual flight mode during flight in an efficient and effective manner. These advantages or technical effects, and/or other advantages or technical effects, will become more apparent to a person skilled in the art as the multi-monocopter system 100 is described in more detail according to various embodiments and example embodiments of the present invention.

In various embodiments, the flight controller 106 and the magnetic connector 118 are each positioned to have a respective offset from the leading edge 116 of the wing member 110 in a direction at least substantially opposite to a direction of the thrust configured to be generated by the thrust unit 114.

In various embodiments, the housing member 104 has further disposed thereon (thereby housing): a speed controller communicatively coupled to the flight controller 106 and the thrust unit 114; and a power source (e.g., battery) configured to power the flight controller 106, the speed controller and the thrust unit 114. In various embodiments, the flight controller 106 is operable to control the thrust unit 114 via the speed controller. Furthermore, the speed controller and the power source are each positioned to have a respective offset from the leading edge 116 of the wing member 110 in the direction at least substantially opposite to the direction of the thrust configured to be generated by the thrust unit 114. In various embodiments, the flight controller 106, the speed controller, the power source and the magnetic connector 118 may each be positioned to have the respective offset from the leading edge 116 of the wing member 110 so as to seek to achieve a balance of the torques caused by aerodynamic force and precession motion acting on the monocopter during flight. In various embodiments, the flight controller 106, the speed controller, the power source and/or the magnetic connector 118 are configured or arranged to have the respective offset so as to increase the relative distance (in the direction at least substantially opposite to the direction of the thrust configured to be generated by the thrust unit 114) of the center of pressure of the wing member 110 and the center of mass of the monocopters as a whole 100 in the cooperative configuration to enhance flight stability. For example, the equilibrium state can be reached when the effect of propeller, aerodynamic force and centrifugal force are balanced with each other. In various example embodiments, this may be achieved by designing or configuring various components, such as the flight controller 106, the speed controller, the power source and/or the magnetic connector 118, so as to result in appropriate or desired relative positions of the center of mass of the monocopter 102 and the center of pressure of the wing member 110.

In various embodiments, the wing member 110 comprises an airframe configured to have a general L-shape and the wing member 110 is coupled to the housing member 104 via the airframe such that the flight controller 106 and the magnetic connector 118 are each positioned to have the respective offset from the leading edge 116 of the wing member 110.

In various embodiments, the thrust unit 114 is coupled to the leading edge 116 of the wing member 110 at a distal end portion thereof and is configured to generate the thrust in a direction at least substantially perpendicular to the leading edge 116 of the wing member 110 and at least substantially along a plane of the wing member 110. In various embodiments, the location of the thrust unit 114 along the leading edge 116 may be configured based on a desired magnitude of rotation torque to be generated by the thrust unit 114, such as to maximise the magnitude of rotation torque as appropriate. For example, the thrust unit 114 may be located at the distal end portion of the leading edge 116 such as at a location in a range of about 85% to about 100% of the length of the leading edge 116.

In various embodiments, the magnetic connector 118 comprises a magnetic protruding portion configured for connecting to the above-mentioned one or more corresponding magnetic connectors 118 of the above-mentioned other one or more monocopters 102 of the plurality of monocopters via the above-mentioned magnetic force.

In various embodiments, the thrust unit 114 comprises a propeller and a motor configured to rotate (or drive) the propeller.

In various embodiments, the above-mentioned each of the plurality of monocopters is a single actuator monocopter.

In various embodiments, the flight controller 106 is configured to control the flight of the monocopter 102 in the individual flight mode and control the flight of the plurality of monocopters collectively in the cooperative flight mode based on a reduced flight dynamic model. In this regard, the reduced dynamic model is configured to approximate an individual flight dynamic of the monocopter 102 in the individual flight mode based on a gyroscope model of the monocopter 102 in the individual flight mode and approximate a cooperative flight dynamic of the plurality of monocopters collectively in the cooperative flight mode based on a gyroscope model of the plurality of monocopters collectively in the cooperative flight mode. In various embodiments, the gyroscope model of the monocopter 102 in the individual flight mode and the gyroscope model of the plurality of monocopters collectively in the cooperative flight mode may be the same gyroscope model.

In various embodiments, the gyroscope model of the monocopter 102 in the individual flight mode is configured based on a relaxed hovering condition of the monocopter 102 in the individual flight mode. In various embodiments, the gyroscope model of the plurality of monocopters collectively in the cooperative flight mode is configured based on a relaxed hovering condition of the plurality of monocopters collectively in the cooperative flight mode.

In various embodiments, the flight controller 106 comprises a position controller comprising: a translational controller configured to determine a target acceleration in a target direction (e.g., a target acceleration and a target direction of the target acceleration) based on a first position error in a first direction and a second position error in a second direction in a 3D space, the first and second directions being along a horizontal plane; and an altitude controller configured to determine a target acceleration in a third direction perpendicular to the horizontal plane based on a third position error in the third direction in the 3D space. The first, second and third position errors may be those of a monocopter 102 in the 3D space operating individually in the individual flight mode or those of the plurality of monocopters collectively (e.g., as a whole) in the 3D space operating cooperatively in the cooperative flight mode. The flight controller 106 further comprises an attitude controller configured to generate a target attitude signal based on the target acceleration in the target direction from the translational controller. In various embodiments, the attitude controller may be configured to generate the target attitude signal further based on a heading angle (e.g., a current or detected heading angle) of the monocopter 102.

In various embodiments, the flight controller 106 is configured to control the flight of the monocopter 102 in the individual flight mode and the flight of the plurality of monocopters collectively in the cooperative flight mode based on controlling the thrust unit 114 to generate the thrust based on the target attitude signal and the target acceleration in the third direction.

In various embodiments, the target attitude signal generated by the attitude controller is a cyclic signal configured to pulse the thrust unit at a determined heading angle of the monocopter and with a determined magnitude in each of a plurality of rotation cycles.

Figure 2:
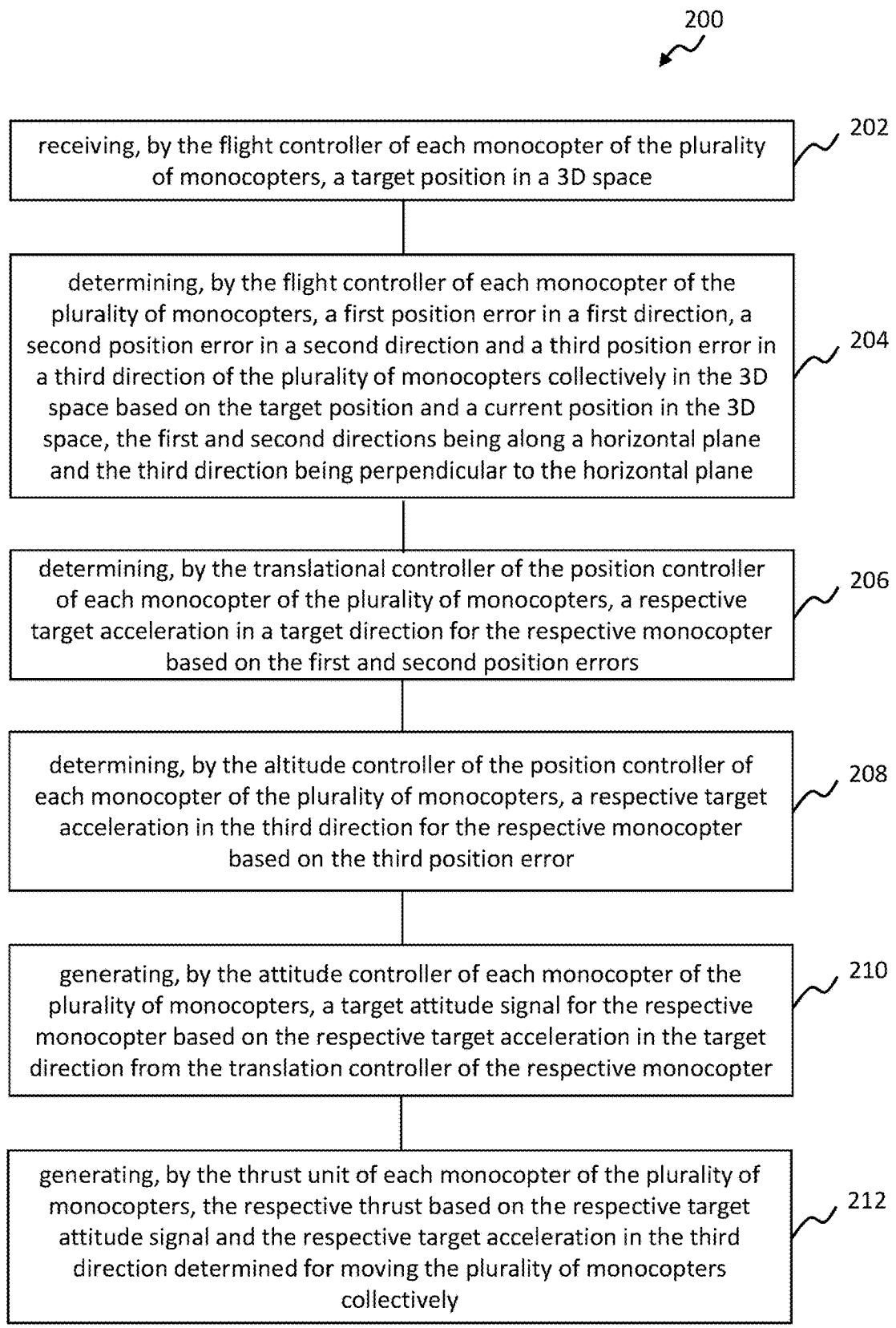
FIG. 2 depicts a schematic flow diagram of a method of operating the multi-monocopter system, according to various embodiments of the present invention.

FIG. 2 depicts a schematic flow diagram of a method 200 of operating the multi-monocopter system 100 according to various embodiments of the present invention.

In various embodiments, wherein the plurality of monocopters are operating cooperatively in the cooperative flight mode, the method 200 comprising: receiving (at 202), by the flight controller 106 of each monocopter 102 of the plurality of monocopters, a target position (e.g., of the plurality of monocopters collectively) in a 3D space; determining (at 204), by the flight controller 106 of each monocopter 102 of the plurality of monocopters, a first position error in a first direction, a second position error in a second direction and a third position error in a third direction of the plurality of monocopters collectively in the 3D space based on the target position and a current position (e.g., of the plurality of monocopters collectively) in the 3D space, the first and second directions being along a horizontal plane and the third direction being perpendicular to the horizontal plane; determining (at 206), by the translational controller of the position controller of each monocopter 102 of the plurality of monocopters, a respective target acceleration in a target direction for the respective monocopter 102 based on the first and second position errors; determining (at 208), by the altitude controller of the position controller of each monocopter 102 of the plurality of monocopters, a respective target acceleration in the third direction for the respective monocopter 102 based on the third position error; generating (at 210), by the attitude controller of each monocopter 102 of the plurality of monocopters, a target attitude signal for the respective monocopter 102 based on the respective target acceleration in the target direction from the translation controller of the respective monocopter; and generating (at 212), by the thrust unit 114 of each monocopter 102 of the plurality of monocopters, the respective thrust based on the respective target attitude signal and the respective target acceleration in the third direction determined for moving the plurality of monocopters collectively (e.g., to the target position).

In various embodiments, the method 200 further comprises receiving, by the flight controller 106 of each monocopter 102 of the plurality of monocopters, a target rotational speed (e.g., of the plurality of monocopters collectively) for controlling the rotational speed of the plurality of monocopters collectively to produce a centrifugal force that exceed the above-mentioned magnetic force for separating the plurality of monocopters connected (e.g., being held together) via the above-mentioned magnetic force so as to convert the cooperative flight mode to the individual flight mode.

In various embodiments, wherein the plurality of monocopters are operating individually in the individual flight mode, the method 200 further comprises: receiving, by the flight controller 106 of each monocopter 102 of one or more monocopters of the plurality of monocopters, a respective target position of the respective monocopter in the 3D space; determining, by the flight controller of each monocopter 102 of the above-mentioned one or more monocopters of the plurality of monocopters, a respective first position error in a first direction, a respective second position error in a second direction and a respective third position error in a third direction of the respective monocopter in the 3D space based on the respective target position and a respective current position of the respective monocopter 102 in the 3D space, the first and second directions being along a horizontal plane and the third direction being perpendicular to the horizontal plane; determining, by the translational controller of the position controller of each monocopter 102 of the above-mentioned one or more monocopters of the plurality of monocopters, a respective target acceleration in a target direction for the respective monocopter based on the respective first and second position errors; determining, by the altitude controller of the position controller of each monocopter 102 of the above-mentioned one or more monocopters of the plurality of monocopters, a respective target acceleration in the third direction for the respective monocopter 102 based on the respective third position error; and generating, by the attitude controller of each monocopter 102 of the above-mentioned one or more monocopters of the plurality of monocopters, the respective target attitude signal for the respective monocopter 102 based on the respective target acceleration in the target direction from the respective translation controller; and generating, by the thrust unit 114 of each monocopter 102 of the above-mentioned one or more monocopters of the plurality of monocopters, the respective thrust based on the respective target attitude signal and the respective target acceleration in the third direction determined for moving the respective monocopter 102 individually to the respective target position.

Figure 3:
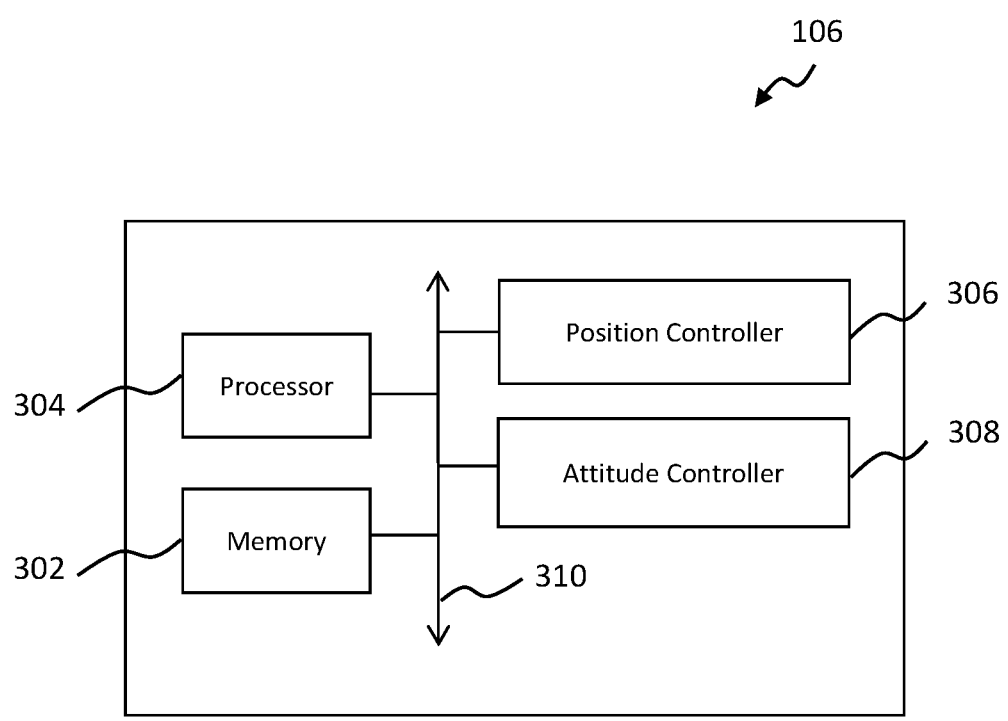
FIG. 3 depicts a schematic block diagram of a flight controller configured to control a flight of the monocopter operating individually in the individual flight mode and control a flight of the plurality of monocopters collectively operating cooperatively in the cooperative flight mode, according to various embodiments of the present invention.

FIG. 3 depicts a schematic block diagram of the flight controller 106 configured to control a flight of the monocopter 102 operating individually in the individual flight mode and control a flight of the plurality of monocopters collectively operating cooperatively in the cooperative flight mode, according to various embodiments of the present invention. The flight controller 106 comprises: at least one memory 302; and at least one processor 304 communicatively coupled to the at least one memory 302 and configured to perform the above-mentioned method 200 of operating the multi-monocopter system 100 as described hereinbefore according with reference to FIG. 2 according to various embodiments of the present invention.

It will be appreciated by a person skilled in the art that the at least one processor 304 may be configured to perform various functions or operations through set(s) of instructions (e.g., software modules) executable by the at least one processor 304 to perform various functions or operations. Accordingly, as shown in FIG. 3, the flight controller 106 may comprise a position controller 306 (e.g., a position controlling module or circuit) comprising a translational controller configured to determine a target acceleration in a target direction (e.g., a target acceleration and a target direction of the target acceleration) based on a first position error in a first direction and a second position error in a second direction in a 3D space, the first and second directions being along a horizontal plane; and an altitude controller configured to determine a target acceleration in a third direction perpendicular to the horizontal plane based on a third position error in the third direction in the 3D space. The flight controller 106 may further comprise an attitude controller 308 (e.g., an attitude controlling module or circuit) configured to generate a target attitude signal based on the target acceleration in the target direction from the translational controller. It will be appreciated by a person skilled in the art that various components of the flight controller 106 may communicate via an interconnected bus 310.

It will be appreciated by a person skilled in the art that the position controller 306 and the attitude controller 308 are not necessarily separate modules, and they may be realized by or implemented as one functional module (e.g., a circuit or a software program) as desired or as appropriate without deviating from the scope of the present invention. For example, the position controller 306 and the attitude controller 308 may be realized (e.g., compiled together) as one executable software program (e.g., software application or simply referred to as an "app"), which for example may be stored in the at least one memory 302 and executable by the at least one processor 304 to perform various functions/operations as described herein according to various embodiments of the present invention.

In various embodiments, the flight controller 106 corresponds to the method 200 of operating the multi-monocopter system 100 as described hereinbefore with reference to FIG. 2 according to various embodiments, therefore, various functions or operations configured to be performed by the least one processor 304 may correspond to various steps or operations of the method 200 of operating the multi-monocopter system 100 as described hereinbefore according to various embodiments, and thus need not be repeated with respect to the flight controller 106 for clarity and conciseness. In other words, various embodiments described herein in context of the methods are analogously valid for the corresponding systems, and vice versa.

For example, in various embodiments, the at least one memory 302 may have stored therein the position controller 306 and/or the attitude controller 308, which respectively correspond to various steps (or operations or functions) of the method 200 of operating the multi-monocopter system 100 as described herein according to various embodiments, which are executable by the at least one processor 304 to perform the corresponding functions or operations as described herein.

Any computing system or device providing a processing capability may be provided according to various embodiments of the present invention. Such a computing system or device may be taken to include one or more processors and one or more computer-readable storage mediums. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions may also be understood as a "circuit" in accordance with various embodiments. Similarly, a "module" may be a portion of a system according to various embodiments and may encompass a "circuit" as described above, or may be understood to be any kind of a logic-implementing entity.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, description or discussions utilizing terms such as "receiving", "determining", "generating", "controlling" or the like, refer to the actions and processes of a computer system, or similar electronic device, that manipulates and transforms data represented as physical quantities within the computer system into other data similarly represented as physical quantities within the computer system or other information storage or transmission devices.

It will be appreciated by a person skilled in the art that the flight controller 106 may be specially constructed for the required purposes, or may comprise a general purpose computing device selectively activated or reconfigured by computer program(s) stored in the computing device.

In addition, the present specification also at least implicitly discloses a computer program or software/functional module, in that it would be apparent to the person skilled in the art that individual steps of various methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the invention. It will be appreciated by a person skilled in the art that various modules described herein (e.g., the position controller 306 and/or the attitude controller 308) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

A computer program may be stored on any computer readable medium. The computer readable medium may include storage devices such as magnetic or optical disks, memory chips, or other storage devices suitable for interfacing with a computer processor computer. The computer program when loaded and executed on such the computer effectively results in a system or an apparatus that implements various steps of methods described herein.

In various embodiments, there is provided a computer program product, embodied in one or more computer-readable storage mediums (non-transitory computer-readable storage medium(s)), comprising instructions (e.g., the position controller 306 and/or the attitude controller 308) executable by one or more computer processors to perform the method 200 of operating the multi-monocopter system 100, as described herein with reference to FIG. 2 according to various embodiments. Accordingly, various computer programs or modules described herein may be stored in a computer program product receivable by a system or device therein, such as the flight controller 106, for execution by at least one processor 304 of the flight controller 106 to perform various functions or operations.

Software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 4:
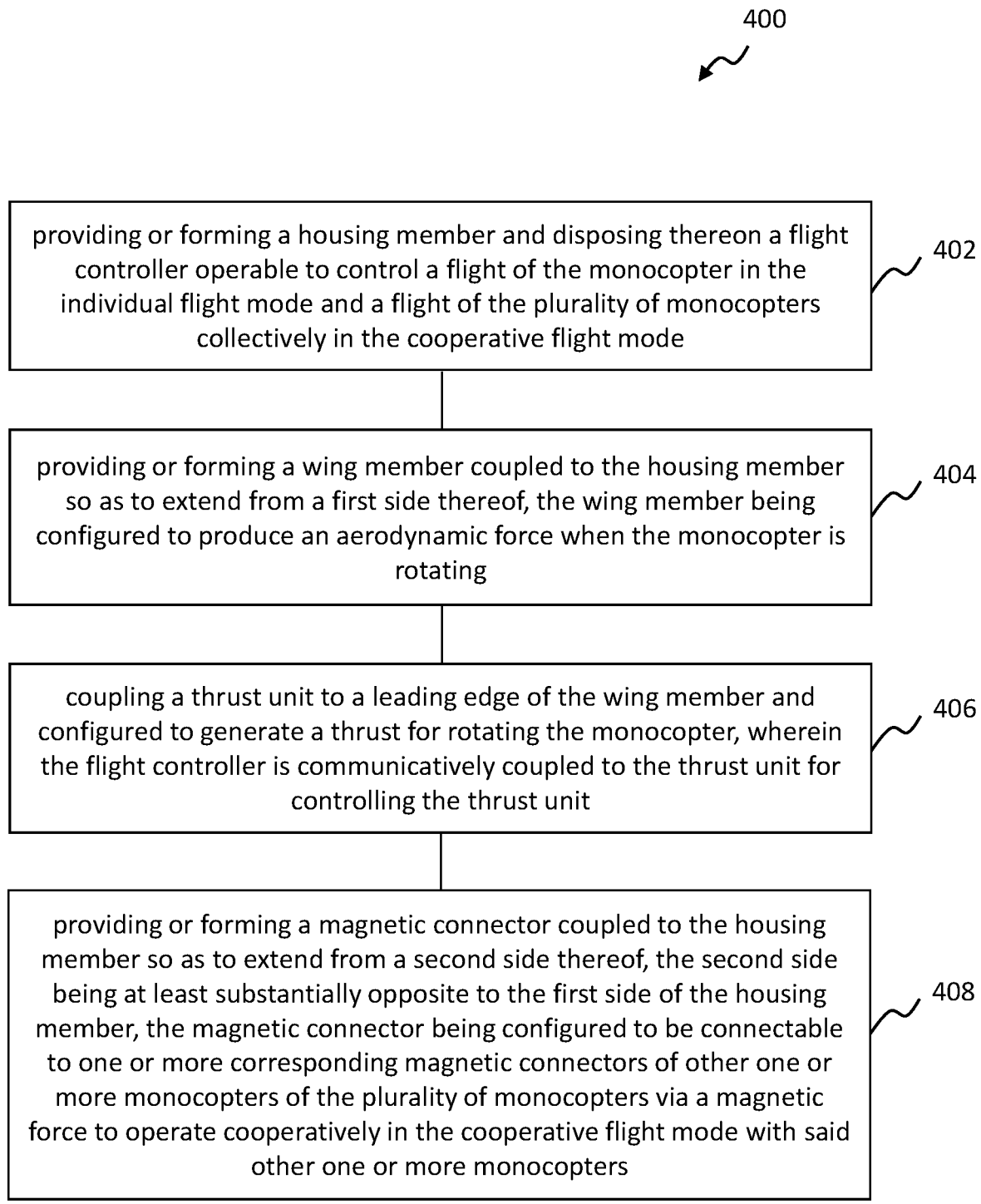
FIG. 4 depicts a schematic flow diagram of a method of forming a monocopter for the multi-monocopter system, according to various embodiments of the present invention.

FIG. 4 depicts a schematic flow diagram of a method 400 of forming a monocopter for the multi-monocopter system 100 according to various embodiments the present invention. It will be appreciated that each of one or more of the plurality of monocopters of the multi-monocopter system 100 may be formed according to the method 400. The method 400 comprises: providing or forming (at 402) a housing member 104 and disposing thereon a flight controller 106 operable to control a flight of the monocopter 102 in the individual flight mode and a flight of the plurality of monocopters collectively in the cooperative flight mode; providing or forming (at 404) a wing member 110 coupled to the housing member 104 so as to extend from a first side 112 thereof, the wing member 110 being configured to produce an aerodynamic force when the monocopter 102 is rotating; and coupling (at 206) (e.g., attached or affixed) a thrust unit 114 to a leading edge 116 of the wing member 110 and configured to generate a thrust for rotating the monocopter 102. The flight controller 106 is communicatively coupled to the thrust unit 114 for controlling the thrust unit 114. The method 400 further comprises providing or forming (at 208) a magnetic connector 118 coupled to (e.g., attached or affixed to or integrally coupled or formed with) the housing member 104 so as to extend from a second side 120 thereof, the second side 120 being at least substantially opposite to the first side 112 of the housing member 104. In this regard, the magnetic connector 118 is configured to be connectable to one or more corresponding magnetic connectors 118 of other one or more monocopters 102 of the plurality of monocopters via a magnetic force to operate cooperatively in the cooperative flight mode with the above-mentioned other one or more monocopters 102. In particular, when the plurality of monocopters are operating cooperatively in the cooperative flight mode during flight, the flight controller 106 is operable to control a rotational speed of the plurality of monocopters collectively to produce a centrifugal force that exceed the above-mentioned magnetic force for separating the plurality of monocopters connected (e.g., held together) via the above-mentioned magnetic force so as to convert the cooperative flight mode to the individual flight mode.

In various embodiments, the method 400 is for forming one or more monocopters 102 of the multi-monocopter system 100 as described hereinbefore with reference to FIG. 1, therefore, various steps or operations of the method 400 may correspond to forming, providing or configuring various components or portions of the monocopter 102 as described hereinbefore according to various embodiments, and thus such corresponding steps or operations need not be repeated with respect to the method 400 for clarity and conciseness. In other words, various embodiments described herein in context of each monocopter 102 of the multi-monocopter system 100 are analogously valid for the method 300 (e.g., for forming one or more monocopters 102 having various components, portions and configurations as described hereinbefore according to various embodiments), and vice versa. It will also be appreciated by a person skilled in the art that the method 400 for forming a monocopter 102 is not limited to any particular order of operations. For example, FIG. 4 does not indicate or limit any particular order of operations in which the method 400 can be performed. Furthermore, one or more operations of the method 400 may be performed concurrently or integrally as desired or as appropriate without going beyond the scope of the present invention, such as but not limited to, integrally forming a portion (e.g., the airframe) of the wing member 110, a portion (e.g., non-magnetic portion) of the magnetic connector 118 and the housing member 104 such as based on 3D printing.

In various embodiments, the wing member 110 and/or the magnetic connector 118 may be provided as separate components with respect to the housing member 104 and then physically coupled (e.g., attached or affixed) to the housing member 104 to form the monocopter 102. In various other embodiments, a portion (e.g., the airframe) of the wing member 110, a portion (e.g., non-magnetic portion) of the magnetic connector 118 and the housing member 104 may be integrally formed (e.g., of the same material) such as based on 3D printing. It will be appreciated by a person skilled in the art that any type of 3D printing material known in the art may be used as desired or as appropriate, such as but not limited to, ONYX. For example, the non-magnetic portion may be configured to include one or more cavities in which one or more magnets may be disposed therein for forming the magnetic connector 118. For example, a contact surface of the magnetic connector 118 may be configured to have a plurality of cavities in which a plurality of magnets may be disposed therein. It will be appreciated by a person skilled in the art that the magnetic connector 118 is not limited to any particular shape or form as long as the magnetic connector 118 is capable of connecting, or adapted to connect, to one or more corresponding magnetic connectors 118 via magnetic force for holding the plurality of monocopters together for the cooperative flight mode.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second" and so forth does not limit the quantity or order of such elements or features, unless stated or the context requires otherwise. For example, such designations may be used herein as a convenient way of distinguishing between two or more elements or instances of an element. Thus, a reference to first and second elements does not necessarily mean that only two elements can be employed, or that the first element must precede the second element. In addition, a phrase referring to "at least one of" a list of items refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Figure 5A:
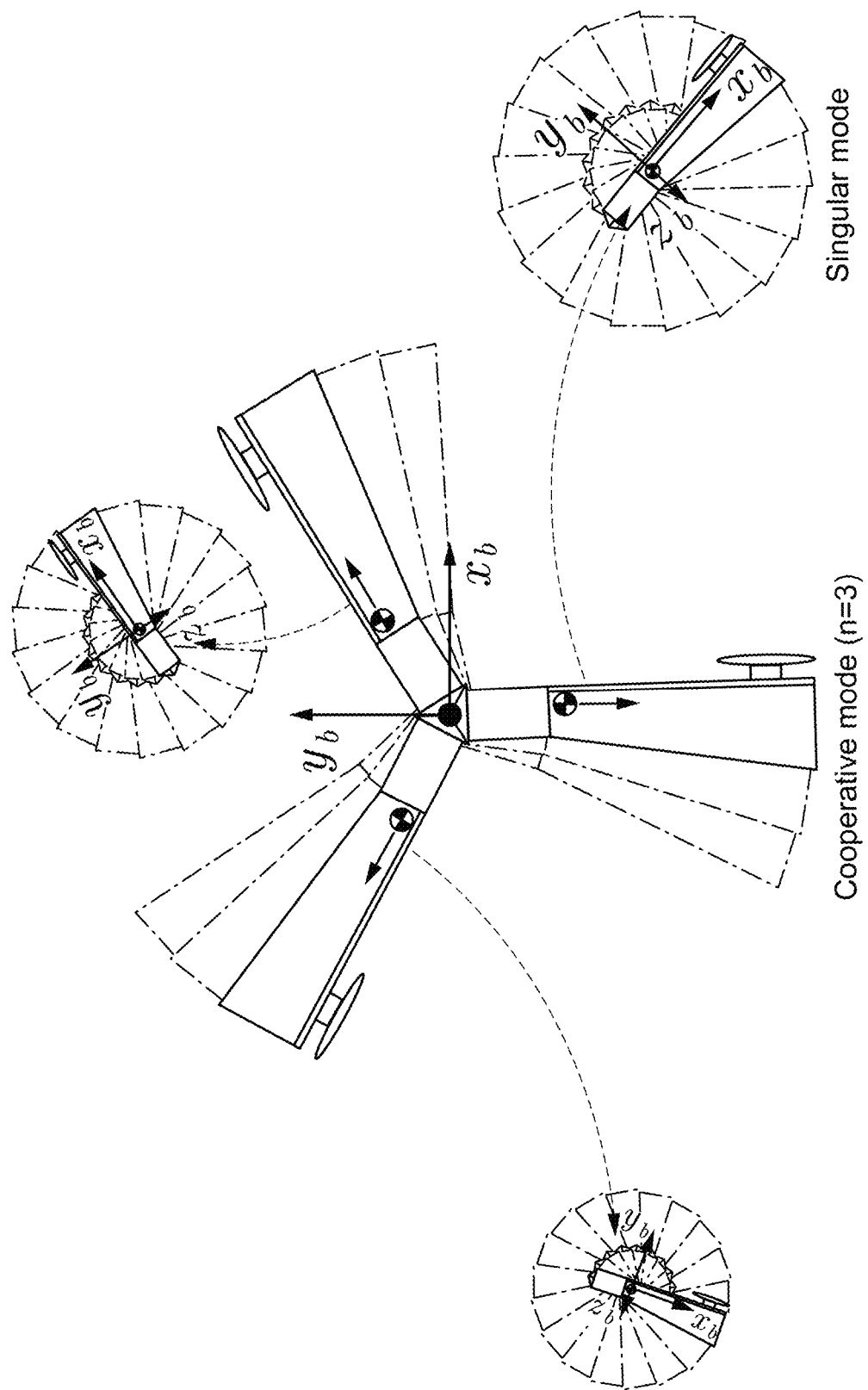
FIG. 5A illustrates multiple M-SAMs (modular single actuator monocopters) attached by magnetic connectors forming a cooperative mode, which can be separated into a singular mode in mid-air, according to various example embodiments of the present invention.
Figure 5B:
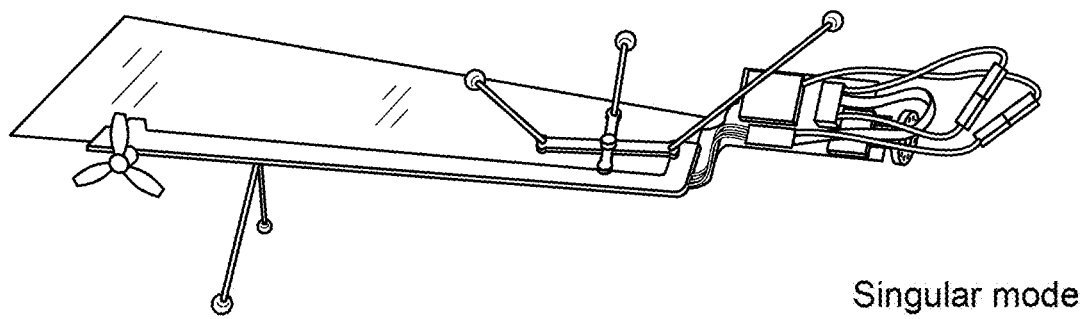
FIGS. 5B and 5C show photos of example prototypes of M-SAMs in action in singular and cooperative modes, respectively, which can be separated into the singular mode in mid-air, according to various example embodiments of the present invention.
Figure 5C:
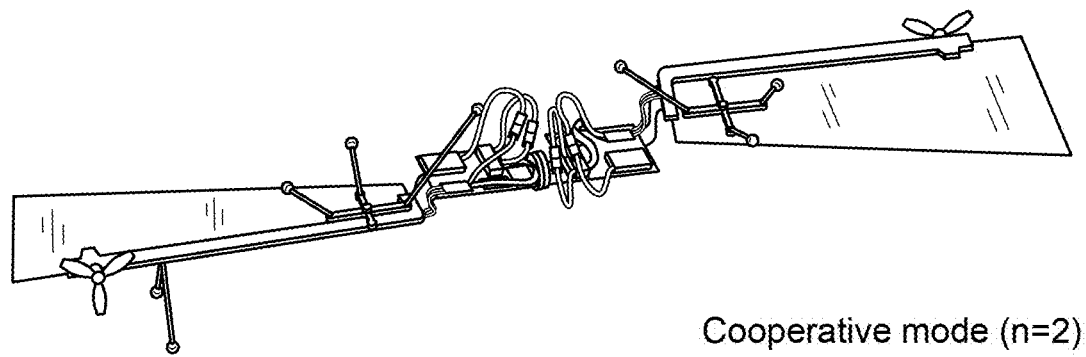

Various example embodiments provide a Modular Single Actuator Monocopter (M-SAM) (e.g., corresponding to the monocopter 102 as described hereinbefore according to various embodiments), which is capable of flying in both singular and cooperative configurations. For example, FIG. 5A illustrates multiple M-SAMs attached by magnetic connectors forming a cooperative mode (e.g., three M-SAMs (n=3) shown as an example), which can be separated into a singular mode in mid-air. For illustration purpose only, FIGS. 5B and 5C show photos of example prototypes of M-SAMs (e.g., two M-SAMs (n=2) shown as an example) in action in the singular and cooperative mode, respectively. A number of multiple M-SAMs collectively or together may thus form a multi-monocopter system. Various example embodiments seeks to provide an M-SAM that is a low-cost, simple-mechanical design and unluxury-control aerial robot.

Previous studies concerning the autorotation of a falling maple seed or a winged robot focused on the modelling, wing shape optimization and controller design. For example, there has been investigated the condition of passive stability of a falling maple seed in nature. By rotating its body, the maple seed is able to decrease the falling speed, allowing it to travel a longer distance. Inspired by this behavior, there has also been presented a controllable autorotation robot, which can achieve a gliding angle of 28.9° during descent. Unlike autorotation mechanism, various example embodiments note employing a motor with propeller allows the winged robot to actively rotate its body and generate lift. In this way, according to various example embodiments, the winged robot is able to take off, hover and track planned trajectory. In contrast to the "monospinner" previously proposed, according to various example embodiments, the lift force of M-SAMs is mostly produced by the revolving wing while the thrust from the propeller balances the corresponding drag force. In the singular mode, the M-SAM rotates about its revolving axis, located near its seed portion due to asymmetrical structure. While in the cooperative mode with symmetrical structure, the revolving axis is located at the end of each unit (M-SAM), making better use of the wing area to generate more lift and consume less power for each unit in flight.

Unlike other types of robots, such as multi-rotors, robotic boats and ground robots, various example embodiments found that it is more challenging for a revolving robot to employ cooperation, reconfiguration and transformable ability due to its non-zero yaw rate during flight. In this regard, various example embodiments provide technical solution(s) to allow revolving aerial robot (monocopter) to work in both cooperative mode and singular mode. Accordingly, various example embodiments provide a multi-monocopter system that is capable of operating cooperatively in a cooperative mode and operating individually in a singular mode.

Design Concepts

Example architectures or configurations of the M-SAM(s) in both singular and cooperative configurations will now be described according to various example embodiments of the present invention.

In order to allow M-SAMs work in both singular and cooperative configurations under the same mechanical structure and controlling strategy, their design concepts in each mode and the passive separation strategy will now be described below according to various example embodiments of the present invention.

Singular Configuration

Figure 9:
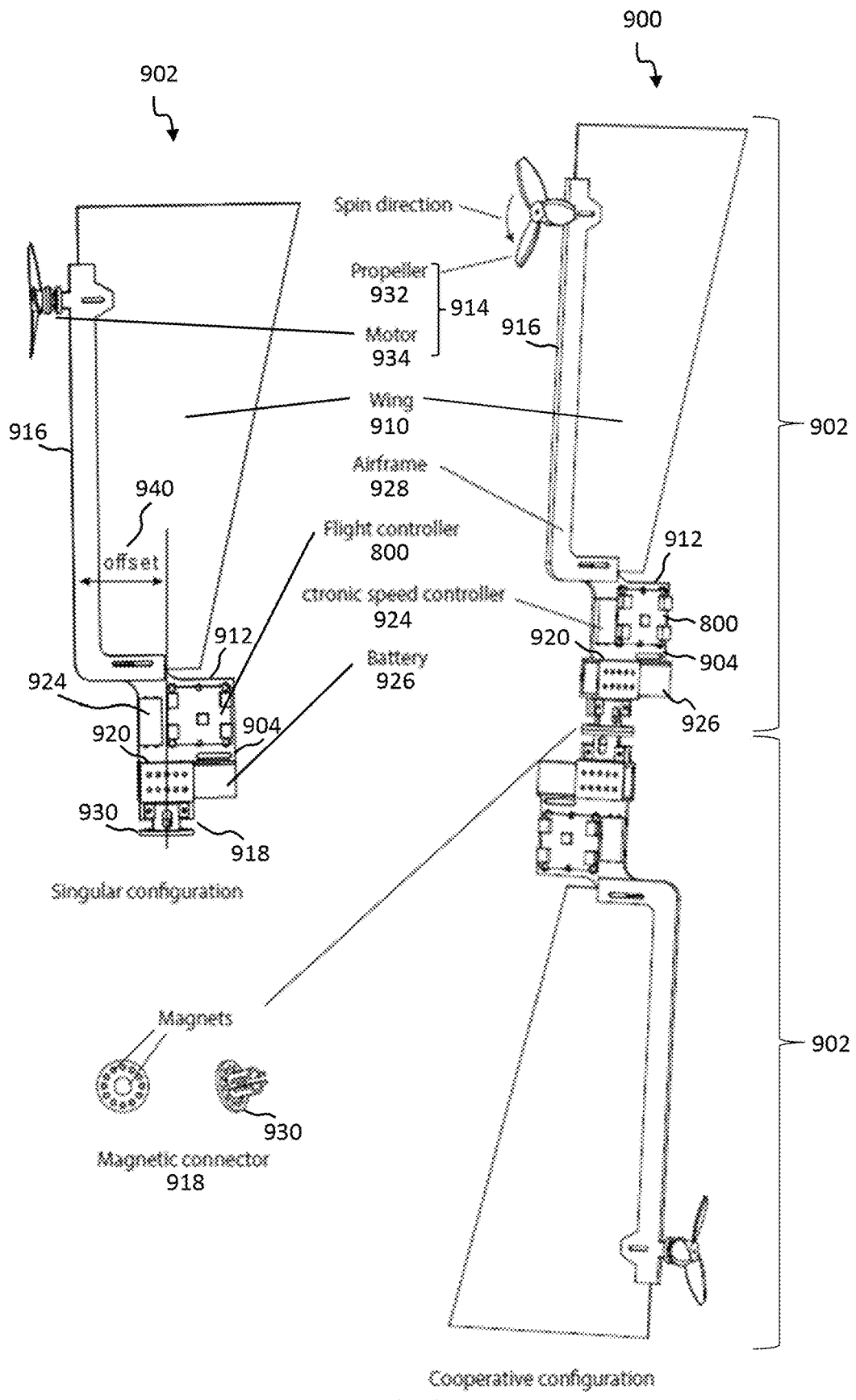
FIG. 9 depicts a schematic drawing of an example M-SAM, according to various example embodiments of the present invention.

In singular configuration, in various example embodiments, each M-SAM has its own flight controller, airframe, battery, propeller and actuator (e.g., a motor rotating the propeller), resulting in nearly identical M-SAM units. For example, as shown in FIG. 5B, the physical structure of the M-SAM is severely asymmetric. As a result, various example embodiments seek to provide or guarantee its attitude stability by mass distribution, wing shape and propeller selection together. In various example embodiments, with reference to FIG. 5B, the flight controller, the battery and the magnet connector together contribute more than a half of the total weight of the M-SAM. In various example embodiments, to achieve a balance of the torques caused by aerodynamic force and precession motion acting on the M-SAM (e.g., expressed in Equation (6) to be described later below), such components are placed at a respective offset from (e.g., at least around 20 mm away from) the leading edge of the wing (in the direction at least substantially opposite to the direction of the thrust configured to be generated by the thrust unit). For example, as shown in FIG. 9 to be described later below, the magnetic connector is positioned to have an offset from the leading edge of the wing member in the direction at least substantially opposite to the direction of the thrust configured to be generated by the thrust unit. On the other hand, to obtain a bigger effective wing area, various example embodiments configure the M-SAM such that the mass is distributed away from the wingspan. In various example embodiments, the wing may be configured as a near rectangular shape (e.g., irregular quadrilateral) with a span of about 260 mm and an aspect ratio of about 2.6. It will be appreciated by a person skilled in the art that the wing shape is not limited to a near rectangular shape, and various wing shapes (e.g., a beam-like shape) may be adopted as desired or as appropriate, such as to obtain a desired flight characteristic or efficiency, without going beyond the scope of the present invention.

Accordingly, it will be appreciated by a person skilled in the art that various dimensions of the M-SAM described herein may be modified or adapted as desired or as appropriate (e.g., depending on the shape and size of the wing), such as to achieve a desired flight characteristic or efficiency, without going beyond the scope of the present invention. The direction of rotation of the propeller is clockwise, thus the torque caused by precession motion helps to pitch the wing upwards.

Cooperative Configuration

Figure 6A:
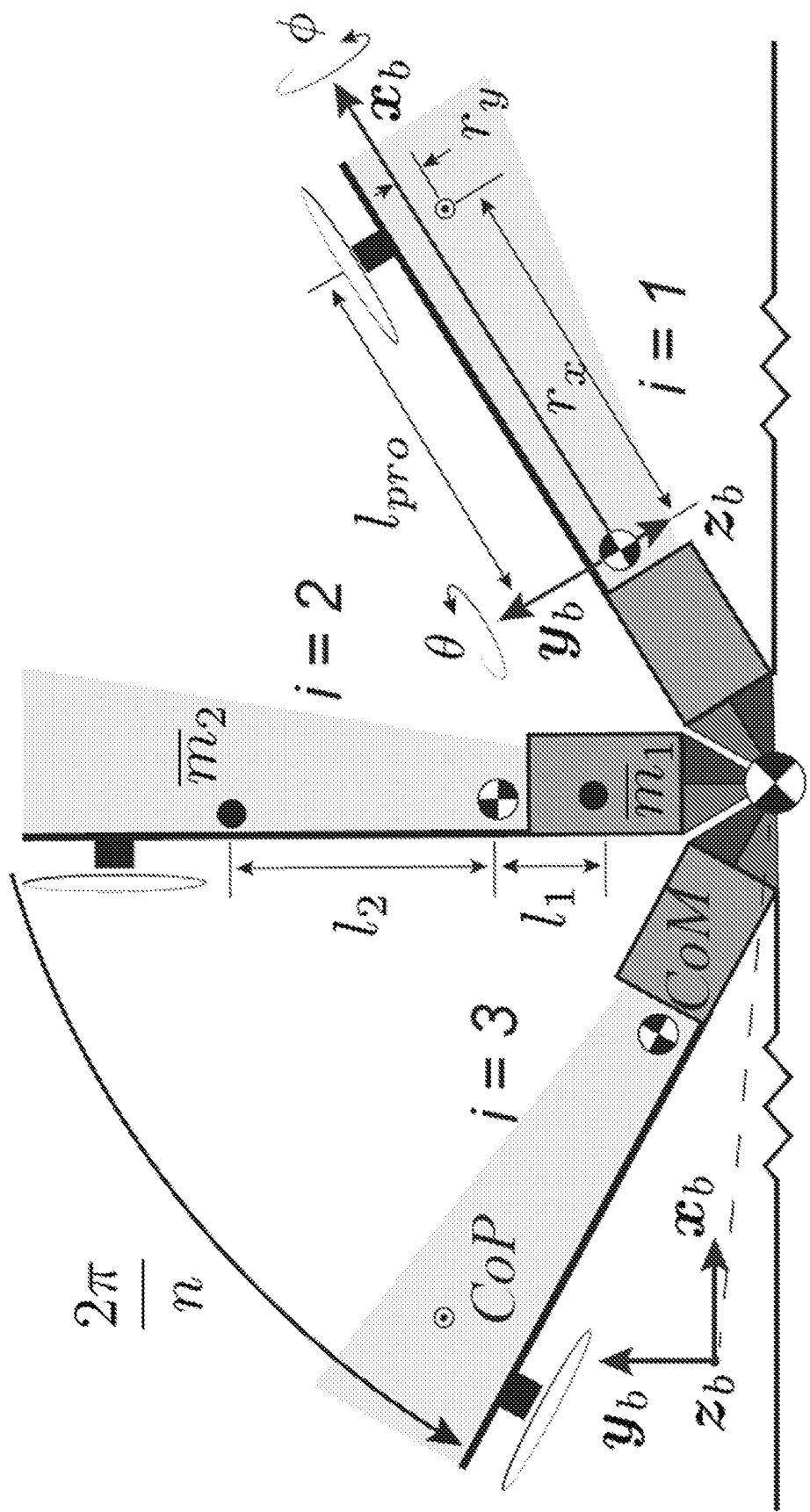
FIG. 6A depicts a schematic drawing of an example cooperative configuration of a number (n) of M-SAM units, along with various coordinates and parameters, according to various example embodiments of the present invention.
Figure 6B:
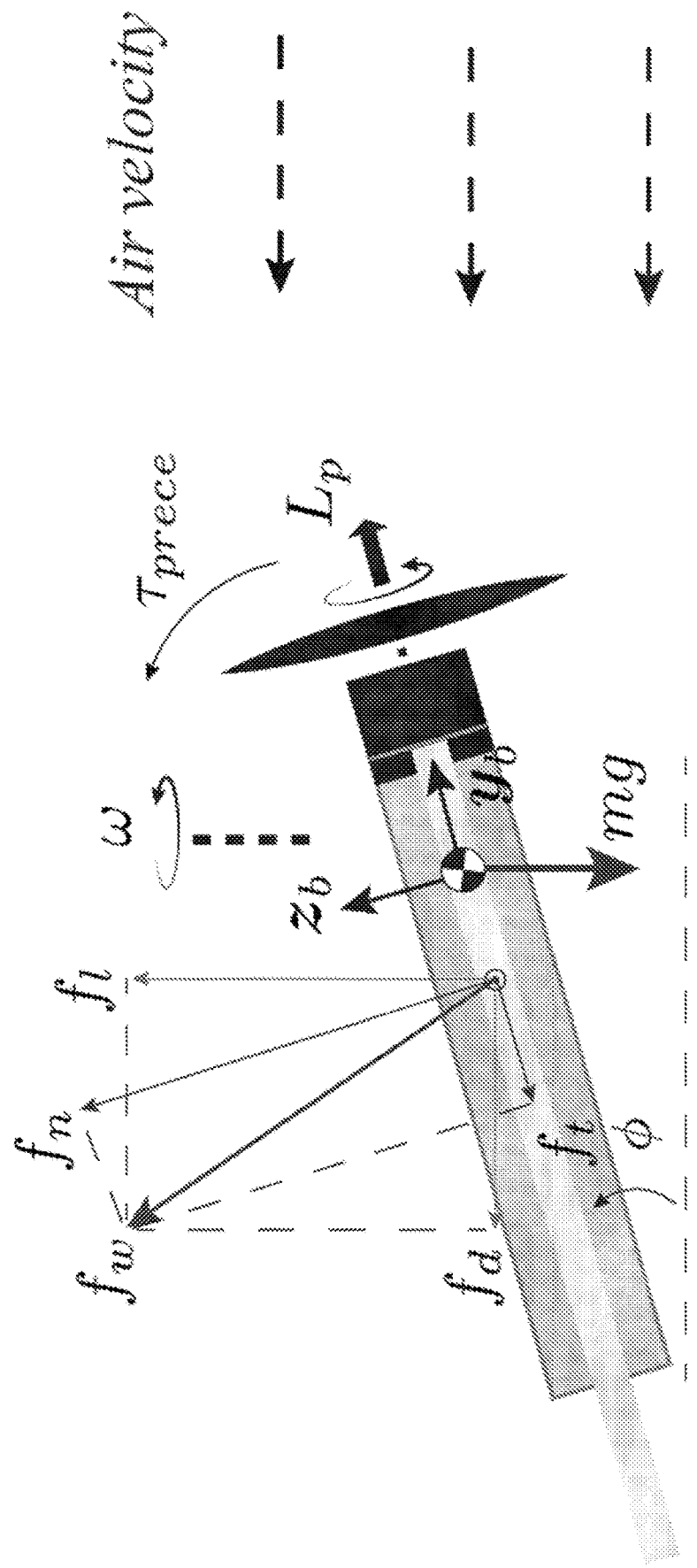
FIG. 6B depicts a schematic drawing showing the aerodynamic force and the precession motion acting on the body of one M-SAM unit, according to various embodiments of the present invention.

In cooperative configuration, multiple M-SAMs are connected to each other by magnetic force. In various example embodiments, each M-SAM unit may be assembled rigidly at a certain or predetermined roll angle $\phi$, such as shown in FIG. 6A, allowing no relative twist motion and movement during flight. Compared to the singular configuration, the cooperative configuration is symmetric about its revolving axis, which increases attitude stability in the flight. FIGS. 6A and 6B depict various coordinates and parameters for M-SAM(s) according to various example embodiments of the present invention. In particular, FIG. 6A depicts a schematic drawing of an example cooperative configuration of a number (n) of M-SAM units, along with various coordinates and parameters shown. FIG. 6B depicts a schematic drawing showing the aerodynamic force and the precession motion acting on the body of one M-SAM unit.

In particular, FIG. 6B illustrates a view of a monocopter (M-SAM) from the $x_b$ axis, looking from a distal end of the wing member (i.e., from the propeller side) to the magnetic connector end. During flight, the motor-propeller spins in a clock-wise direction (denoted by the circling arrow in FIG. 6B), thereby producing a thrust along the $y_b$ direction. Due to the distance between the thrust location and the rotating center of the monocopter, this thrust produces a torque about the rotating axis and along the rotating motion of the monocopter (direction denoted by $\omega$ in FIG. 6B). Due to the rotating motion of the monocopter, the wing member experiences air velocity (illustrated by arrows in FIG. 6B). As a result, the wing member generates an aerodynamic force ($f_w$), which may be made up of drag force ($f_d$) coincident with air velocity direction and lift force ($f_l$) perpendicular to the air velocity direction. For the sake of convenience, the aerodynamic force may be decomposed into tangential force ($f_t$) and normal force ($f_n$) to facilitate ease of representation in the body frame of the monocopter ($x_b$, $y_b$, $z_b$). In FIG. 6B, the angle $\phi$ denotes the angle of attack in the hovering condition. This angle may be passively determined in the singular configuration (e.g., determined or configured based on various factors such as the wing geometry, the mass distribution, the location of center of pressure (CoP) and so on). For example, considering the torque caused by both the precession motion and the aerodynamic force, the total torque acting on $x_b$ may be expressed by Equation (6) as will be described later below according to various example embodiments of the present invention. In the cooperative configuration, the above-mentioned angle $\phi$ is the roll angle as explained above. In FIG. 6B, the angular momentum of the spinning motor-propeller is denoted by $L_p$, which rotates together with the monocopter at speed $\omega$. As a result, the precession torque is generated along the $x_b$ axis, denoted by $\tau_{prece}$ in FIG. 6B.

Separation Mechanism

Various example embodiments advantageously adopted a passive approach to execute the separation of M-SAMs from the cooperative mode to the singular mode in mid-air. Thus, no extra actuator is required for triggering the detachment or separation. In this regard, as M-SAMs revolve at a certain range of rotational speed during flight, various example embodiments take advantage of its centrifugal force to execute the separation. In various example embodiments, a plurality of magnetic connectors of a plurality of M-SAMs are configured with a designed or predetermined magnetic force (or the plurality of magnetic connectors are configured to hold the plurality of M-SAMs together in the cooperative mode with a designed or predetermined magnetic force), which is higher than the centrifugal force in normal flight (e.g., the plurality of M-SAMs operating cooperatively are rotating under a predetermined rotation speed). With the designed magnetic force, the separation can be passively triggered by rapidly increasing rotation speed of the plurality of M-SAMs operating cooperatively such that the centrifugal force overcomes the designed magnetic force.

Dynamic Model

Dynamic modelling of the singular M-SAM (e.g., corresponding to the monocopters 102 of the multi-monocopter system 100 operating individually in the individual flight mode as described hereinbefore according to various embodiments) and the cooperative M-SAMs (e.g., corresponding to the monocopters 102 of the multi-monocopter system 100 operating cooperatively in the cooperative flight mode as described hereinbefore according to various embodiments) will now be described according to various example embodiments of the present invention.

Dynamic Model of Singular M-SAM

1) Translational dynamics: In order to introduce the translational dynamics of a singular M-SAM, various example embodiments use $p=[p_x, p_y, p_z]^T$ to denote its position in the world frame. Considering the forces applied on robot's (M-SAM's) body fixed frame are mainly produced by actuator's (e.g., propeller's) thrust and aerodynamic force of wing, denoted by $F_a$ and $F_w$ respectively, the translational dynamics can be simply written as:

$$m\ddot{p} = R(F_a + F_w) - mge_3 \quad \text{(Equation 1)}$$

where m is the mass of a single M-SAM, R is the rotation matrix, which maps from body fixed frame to the world frame, g is the gravitational constant, and $e_3=[0, 0, 1]^T$ is a basis vector.

As shown in FIG. 6A, the propeller (i.e., the thrust unit) is installed parallel to $y_b$. Let f represent the thrust generated by the propeller, then $F_a=[0, f, 0]^T$.

By referring to Blade Element Theory, the aerodynamic force produced by the wing can be expressed by drag force (D) and lift force (L), given by:

$$dD = \frac{1}{2}\rho c_d V^2 c(r)\, dr, \quad dL = \frac{1}{2}\rho c_l V^2 c(r)\, dr, \quad \text{(Equation 2)}$$

where ρ is the air density, V is the relative air velocity, $c_d$ and $c_l$ are the drag and lift coefficients, and c(r) is the chord function to describe the geometry of the wing.

To simplify the consideration, various example embodiments use a force acting on CoP (Center of Pressure) of the wing to approximate the sum of aerodynamics forces. Then, the drag force and lift forces may be given by:

$$f_d = \frac{1}{2}\rho c_d A(\omega r_x)^2, \quad f_l = \frac{1}{2}\rho c_l A(\omega r_x)^2, \quad \text{(Equation 3)}$$

where A is the area of the wing, $r_x$ is the distance between COM (Center of Mass) and CoP along $x_b$ direction, ω is the rotation speed.

As shown in FIG. 6B, let ϕ be the roll angle of the M-SAM. The aerodynamic force may then be decomposed into normal component ($f_n$) and tangential component ($f_t$), and determined or computed by:

$$f_n = f_l \cos\phi + f_d \sin\phi, \quad f_t = f_l \sin\phi - f_d \cos\phi \quad \text{(Equation 4)}$$

The aerodynamic force of the wing may then be obtained in body fixed frame $F_w=[0, f_t, f_n]^T$. Substituting $F_a$ and $F_w$ into Equation (1), the translational dynamics of a singular M-SAM is obtained, according to various example embodiments of the present invention.

2) Attitude dynamics: Similar to other rigid bodies, the attitude dynamic of the M-SAM can also be described by Euler's equation and may be given by:

$$\tau = I\dot{\Omega} + \Omega \times I\Omega, \quad \text{(Equation 5)}$$

where $\tau=[\tau_x, \tau_y, \tau_z]^T$ is the collective torque act on the M-SAM, $\Omega=[\Omega_x, \Omega_y, \Omega_z]^T$ is the angular velocity with respect to body frame, and I is the inertia moment.

Next, how the above-mentioned torques ($\tau_x, \tau_y, \tau_z$) are generated on each axis are described according to various example embodiments. Unlike quadrotors which produce torque directly by generating unequal thrust, the torque acting on $x_b$ of the M-SAM is resulting from the precession motion (e.g., see FIG. 6B). Let $\overline{\omega}$ and $I_p$ present the spinning speed and the inertia moment of the propeller respectively. The angular momentum of the propeller can be simply computed by $L_p=I_p\overline{\omega}$. At the same time, the angular momentum of the propeller ($L_p$) also rotates with the M-SAM at a speed of ω (M-SAM's revolving speed), resulting in a torque $\tau_{prece}$ on $x_b$. Considering the torque caused by both the precession motion and the aerodynamic force, various example embodiments derive the total torque acting on $x_b$, as:

$$\tau_x = \tau_{prece} - f_n r_y, \quad \text{(Equation 6)}$$

where $r_y$ denotes the distance of COM and CoP in $y_b$ direction (e.g., see FIG. 6A).

According to various example embodiments, $\tau_y$ may be made up of torques caused by the aerodynamic force ($\tau_{aer}$), the propeller ($\tau_{pro}$) and the centrifugal force ($\tau_{cen}$). Accordingly, for example, $\tau_y$ may be determined by:

$$\tau_y = \overline{\frac{\tau_{cen}}{(\overline{m}_1 l_1^2 + \overline{m}_2 l_2^2) \cos(\theta)\sin(\theta)\omega^2}} - \overline{\frac{\tau_{pro}}{c_{pro} f}} - \overline{\frac{\tau_{aer}}{f_n r_x}}, \quad \text{(Equation 7)}$$

where $\overline{m}_1$ and $\overline{m}_2$ are re-distributed mass, $l_1$ and $l_2$ are the distance between $\overline{m}_1$ and $\overline{m}_2$ to revolving axis in $x_b$, θ is the pitch angle (e.g., see FIG. 6A), and $c_{pro}$ is the coefficient of propeller to describe the ratio of thrust and drag force.

According to various example embodiments, torques on $z_b$ are from the aerodynamic force of the wing, the thrust of the propeller, and the drag force acting on the propeller due to the high rotational speed. Accordingly, for example, $\tau_z$ may be expressed as:

$$\tau_z = f l_{pro} - f_t r_x - f_{drag} l_{pro}, \qquad \text{(Equation 8)}$$

Where $l_{pro}$ denotes the distance between propeller and revolving axis in the $x_b$ direction, and $f_{drag}$ is considered as a linear function of air velocity.

Substituting $\tau_x$, $\tau_y$ and $\tau_z$ into Equation (5), the full attitude dynamics of a singular M-SAM is obtained, according to various example embodiments of the present invention.

Dynamic Model of Cooperative M-SAMs

1) Translational dynamics: The translational dynamics of cooperative M-SAMs (corresponding to the plurality of monocopters collectively in the cooperative flight mode) has the same form as Equation (1). Let $F_{i,a}$ and $F_{i,w}$ represent the actuator's (e.g., the propeller's) force (thrust) and the wing's aerodynamic force of the ith M-SAM, $R_i$ denotes the rotation matrix of the ith M-SAM mapping from body fixed frame to world frame, P denotes the position of cooperative M-SAMs (e.g., the position of the cooperative M-SAMs (i.e., the multi-monocopter system) collectively or as a whole) in world frame, $m_i$ denotes the mass of the ith M-SAM, then the translational dynamics may be given by:

$$\sum m_i \ddot{P} = \sum R_i(F_{i,a} + F_{i,w}) - \sum m_i g e_3, \qquad \text{(Equation 9)}$$

where $e_3$ is a basis vector as defined in Equation (1).

2) Attitude dynamics: To derive the attitude dynamics of cooperative M-SAMs, various example embodiments use $\tau_i$ to represent the torque on the ith M-SAMs, $R_o$ to represent the rotation matrix maps from the body frame of cooperative M-SAMs to the world frame, $I_o$ to denote the inertia moment and $\Omega_0$ to denote the angular velocity. According to various example embodiments, the attitude dynamics may thus be expressed by:

$$R_o^T \left( \sum R_i \tau_i \right) = I_o \dot{\Omega}_o + \Omega_o \times I_o \Omega_o. \qquad \text{(Equation 10)}$$

The propeller thrust and aerodynamic force may cause different torques in the cooperative mode. In this regard, various example embodiments consider only symmetric configuration for the attitude dynamics of cooperative M-SAMs, which allows to focus on the effect of torque of propeller reaction and precession motion.

Equilibrium States and Relaxed Hovering Condition

A relaxed hovering condition of the singular M-SAM and the cooperative M-SAMs will now be described according to various example embodiments of the present invention.

1) Singular M-SAM: In the singular mode, the attitude dynamics of the M-SAM is tightly coupled due to the severe underactuation. Due to their interaction, the attitude of the M-SAM is able to reach an equilibrium state by controlling only a single actuator, according to various example embodiments of the present invention. Given a constant input f (e.g., corresponding to the thrust generated by the thrust unit (e.g., the propeller)), the equilibrium states of attitude ($\phi^*$, $\theta^*$, $\omega^*$) can be calculated by solving equations:

$$\tau(f, \phi^*, \theta^*, \omega^*) = 0, \qquad \text{(Equation 11)}$$

where $\tau$ has been introduced above under "Attitude dynamics" of section "Dynamic model of singular M-SAM". Due to the non-zero yaw rate, various example embodiments note that the robot (i.e., the M-SAM) is not likely to meet the strict hovering condition of remaining zero acceleration and angular velocity. To address this technical problem, various example embodiments provide a technical solution of introducing a relaxed hovering condition, which may be found by meeting both Equation (11) and $$R_{(3,:)}(F_a + F_w) = mg, \qquad \text{(Equation 12)}$$

where $R_{(3,:)}$ denotes the third row of R.

Accordingly, the relaxed hovering condition is introduced with respect to the strict hovering condition according to various example embodiments of the present invention. The strict hovering condition requires zero angular acceleration, zero angular velocity, zero translational acceleration and zero translation speed. In other words, the torque and force applied on the body frame should be zero and remain steady with respect to the inertia frame when in the strict hovering condition. However, for monocopters, various example embodiments note that this condition is not likely to be met. To address such a technical problem, according to various example embodiments, the relaxed hovering condition is provided as: the total torque and force applied on the body frame is zero, the translational speed is zero, while the rotating speed remains constant.

In this regard, Equation (11) requires that the torque applied in the x, y and z axis of the body frame be zero with the state of f, $\phi^*$, $\theta^*$, $\omega^*$. In other words, in the relaxed hovering state, the total torque applied on the body frame is zero but rotating at a constant speed of $\omega^*$. R denotes a 3 by 3 rotation matrix of the monocopter (M-SAM), which maps from the body frame to the inertia frame. For example, a 1 by 3 force vector $f_{body}$ in the body frame can be represented in the inertia frame by: $f_{inertia} = R f_{inertia}$. Note that $f_{inertia}$ is a 1 by 3 vector, representing $f_x$, $f_y$ and $f_z$ in the inertia frame. In Equation (12), $(F_a + F_w)$ represents the collective thrust produced by the propeller (propeller's force) and the wing (aerodynamic force) together. Therefore, by multiplying $(F_a + F_w)$ with the third row of R according to Equation (12), the total thrust in the z-axis in the inertia frame is obtained. In order to hover, the total thrust in z-axis in the inertial frame needs to overcome the gravity (i.e., mg), which is the operation of Equation (12). In this regard, the thrust component in the x-axis and the y-axis in the inertial frame are cancelled over a rotation cycle. Accordingly, by combining Equations (11) and (12), the condition for relaxed hovering is obtained according to various example embodiments of the present invention.

For better understanding, the third column of R represents the z-axis. $(F_a + F_w)$ multiplied with the third row of R means the sum of the projections of forces in x-axis, y-axis and z-axis (of body frame) in the inertia frame. In other words, multiplying $(F_a + F_w)$ with the third row of R reflects, or would result in, the collective force of the robot in the z-axis in the inertia frame. However, multiplying $(F_a + F_w)$ with the third column of R reflects, or would result in, only the force in z-axis (in the body frame) projected in the inertia frame. In this regard, various example embodiments of the present invention seek to sum all the forces in the inertia frame to overcome the gravity. In practice, the value of the above two representations may be similar, however, in the view of math and dynamics, various example embodiments found that multiplying $(F_a+F_w)$ with the third row of R is more accurate.

2) Cooperative M-SAMs: Unlike the singular mode, the configuration of the cooperative mode is symmetric and its equilibrium of attitude can be easily obtained as $\phi_o^*=0$, $\theta_o^*=0$. According to various example embodiments, given the input $(f_i)$ of ith M-SAM (e.g., corresponding to the thrust generated by the thrust unit (e.g., the propeller) of the ith M-SAM), $\omega_o^*$ can be derived by solving equation:

$$e_3^T R_o^T \left(\sum R_i \tau_i\right) = 0. \quad \text{(Equation 13)}$$

The relaxed hovering condition for the cooperative mode needs to also meet the equation of:

$$\sum R_{i(3,:)}(F_{a,i} + F_{w,i}) = \sum m_i g. \quad \text{(Equation 14)}$$

Accordingly, Equations (13) and (14) for the cooperative M-SAMs respectively correspond to Equations (11) and (12) for the singular M-SAM. In the cooperative configuration, the structure of the cooperative M-SAMs as a whole is assumed to be symmetric. Therefore, the applied torque in the x-axis and y-axis of the body frame is balanced with each other. Equation (13) requires that the torque in the z-axis of body-frame is zero. Equation (14) requires that the sum of thrusts of all of the cooperative monocopters in the x-axis, y-axis and z-axis in the inertial frame is balanced with gravity (i.e., $\Sigma m_i g$) (similar to Equation (12) for the singular M-SAM). Accordingly, Equations (11) to (14) indicate non-torque and non-force applied to the robot (cooperative M-SAMs) to meet the relaxed hovering condition.

Gyroscope Motion and Reduced Dynamics

Example full dynamics for M-SAM(s) in both the singular mode and the cooperative mode have now been described hereinbefore according to various example embodiments of the present invention. Furthermore, according to the full dynamics, equilibrium states in each of the singular and cooperative configurations and their respective relaxed hovering conditions have also been described hereinbefore according to various example embodiments of the present invention. However, various example embodiments found that it may still be difficult to develop an effective flight controller based on the full dynamics even with the relaxed hovering condition due to the high nonlinearity and underactuation. To address this technical problem and provide a technical solution, various example embodiments note that as the robot rotates at a high angular velocity (e.g., about 60 rads/s at singular mode and about 35 rads/s at cooperative mode) in the relaxed hovering condition, various example embodiments advantageously abstract their near hovering flight dynamics to a gyroscope model. In this way, a reduced dynamics is derived for the purpose of designing a general flight controller for both the singular and cooperative modes according to various example embodiments of the present invention.

Figure 7:
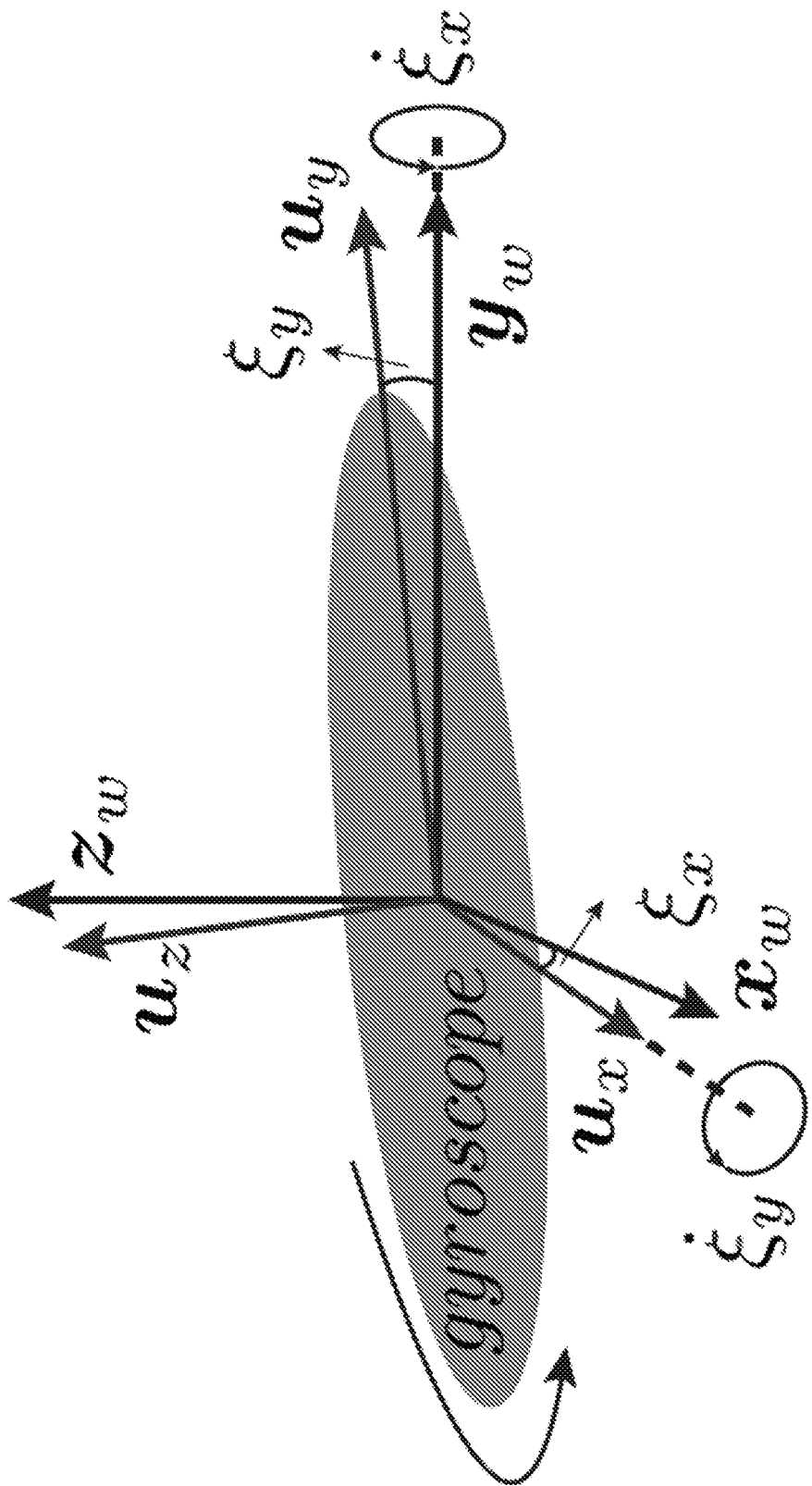
FIG. 7 depicts a schematic drawing illustrating a gyroscope model, along with various parameters, according to various example embodiments of the present invention.

To model a gyroscope, various example embodiments use $I_a$ and $I_d$ to denote its axial and diameter moment respectively, and $\xi_x$ and $\xi_y$ to denote its angular deviation in x and y axis with respect to the world frame. FIG. 7 depicts a schematic drawing illustrating a gyroscope model, along with various parameters shown, according to various example embodiments of the present invention. In particular, the gyroscope model is configured to approximate or estimate the flight dynamics of M-SAM. As shown, the world frame and the body frame of the gyroscope are represented by $(x_w, y_w, z_w)$ and $(u_x, u_y, u_z)$, respectively.

Then, according to various example embodiments, the total angular momentum of the robot (i.e., the M-SAM) can be represented by:

$$L = I_a \omega * u_z + I_d \dot{\xi}_y u_x + I_d \dot{\xi}_x u_y, \quad \text{(Equation 15)}$$

where $\omega^*$ is the revolving velocity of the singular or cooperative mode in relaxed hovering condition.

According to various example embodiments, under the assumption of small displacement of $\xi_x$ and $\xi_y$, the unit vector of the moving frame of gyroscope can be approximated as $u_x=[1, 0, -\xi_y]^T$, $u_y=[0, 1, \xi_x]^T$, $u_z=[\xi_x, \xi_y, 1]^T$. The rotational motion equation of gyroscope can be calculated by taking derivative with respect to time, as $$\tau_{gyro} = \frac{dL}{dt}.$$

By substituting Equation (15), taking x, y components, various example embodiments obtain:

$$\hat{\tau}_{gyro} = I_a \omega \begin{bmatrix} 0 & 1 \\ -1 & 0 \end{bmatrix} \begin{bmatrix} \dot{\xi}_x \\ \dot{\xi}_y \end{bmatrix} + I_d \begin{bmatrix} \ddot{\xi}_x \\ \ddot{\xi}_y \end{bmatrix}. \quad \text{(Equation 16)}$$

For better understanding, for example, consider a monocopter hovering in the inertia frame at a rotating speed of $\omega$. In every single time stamp, the torque generated by the monocopter is in a single direction. For example, when the x-axis of the monocopter (in the body-frame) is pointing to the EAST (in the inertia frame), the precession torque can be produced only in the EAST (in the inertia frame) by pulsing the thrust unit (e.g., the motor-propeller) at this moment. After some time (e.g., $\Delta t$), the x-axis (in the body-frame) turns to point to the WEST (in the inertia frame) because of the rotation speed ($\omega$), the monocopter will only be able to generate torque along the WEST in the inertia frame. In other words, the monocopter is conventionally understood to only be able to generate torque in a fixed direction in the body-frame owing to the severe underactuation (for example, compared to a quadrotor, a monocopter only has one actuator). To address this technical problem, various example embodiments of the present invention provide a technical solution by taking advantage of the self-rotating motion such that the monocopter can generate torque in any direction in a horizontal plane in the inertia frame (such as North, East, South, West). In particular, according to various example embodiments, this is achieved by considering the collective torque acting on the monocopter in a rotating cycle (not in a single time stamp). In this regard, various example embodiments introduce a gyroscope (and thus a gyroscope model) to replace the full dynamic of the monocopter in the rotation cycle. In other words, the gyroscope (and thus the monocopter) is able to generate torque in any arbitrary direction in the horizontal plane according to various example embodiments of the present invention.

Therefore, according to various example embodiments of the present invention, $\hat{\tau}_{gyro}$ in Equation (16) represents the torque of the gyroscope (reduced dynamic model), which corresponds to the collective thrust of monocopter (full dynamic model) in a rotating period (a period of a rotating cycle). In other words, by abstracting the monocopter in hovering flight as a spinning disk, the complex force model is advantageously simplified. Accordingly, with the reduced dynamic model, consideration of the design of the flight controller is advantageously simplified according to various example embodiments of the present invention. Accordingly, the torque ($\hat{\tau}_{gyro}$) of the gyroscope obtained in Equation (16) is based on the full dynamics (first and second orders) of a gyroscope dynamics in term of x-axis and y-axis.

In the case of M-SAM in relaxed hovering condition, $\hat{\tau}_{gyro}$ can be generated by controlling the propeller speed at a particular yaw angle cyclically. Note that the reduced dynamic model is developed with the relaxed hovering condition because the monocopter needs to rotate at some speed to obtain the ability of gyroscopic motion. As explained above in relation to Equation (16), $\hat{\tau}_{gyro}$ can be produced in any direction in the inertia frame according to various example embodiments by determining the particular or correct heading angle of the monocopter (the heading angle corresponds to the direction of x-axis in the body frame with respect to the inertia frame, e.g., denoted by $\hat{\psi}$ in Equation (17) below). For example, the yaw angle is the same as the heading angle to some extent. By way of an illustrative example only and without limitation, in order to generate a torque about the direction of EAST (in the inertia frame), according to various example embodiments, the motor increases the spin speed of the propeller when the x-axis in the body frame (heading angle) is pointing to the EAST while decreases the spin speed of the propeller when the heading angle is pointing to the WEST direction. By operating the monocopter in this manner cyclically (e.g., for each rotation cycle of a plurality of rotation cycles), a target torque in a target direction in the inertia frame can be generated according to various example embodiments of the present invention. In other words, $\hat{\tau}_{gyro}$ can be generated by controlling the propeller speed at a particular yaw angle cyclically.

In view of the above explanation, suppose M-SAM in both singular and cooperative mode can generate torque $\hat{\tau}$ at an exact yaw angle $\hat{\psi}$, the attitude dynamics of the gyroscope becomes:

$$\hat{\tau}\begin{bmatrix}\cos\hat{\psi}\\ \sin\hat{\psi}\end{bmatrix}=I_a\omega\begin{bmatrix}0 & 1\\ -1 & 0\end{bmatrix}\begin{bmatrix}\dot{\xi}_x\\ \dot{\xi}_y\end{bmatrix}+I_d\begin{bmatrix}\ddot{\xi}_x\\ \ddot{\xi}_y\end{bmatrix}.$$ (Equation 17)

Accordingly, Equation (17) describes the rotational dynamics of a gyroscope rotating at a speed of $\omega$. At the left side of Equation (17), $\hat{\tau}$ denotes the torque generated by pulsing the thrust unit (e.g., the motor-propeller), and its magnitude depends on the spinning speed of the motor-propeller. $\hat{\psi}$ denotes the heading angle of the monocopter, which may range from 0 to 360 degrees. The right side of Equation (17) describes the rotation motion of the gyroscope after applying the torque $\hat{\tau}$ when the heading angle is $\hat{\psi}$ (at left side of Equation (17)). The first and second time derivatives represent the angular speed and acceleration, respectively. Accordingly, Equation (17) shows that a right or target torque $\hat{\tau}$ generated at a right or target heading angle $\hat{\psi}$ can result in a desired or target attitude of the gyroscope (and thus also the monocopter in the relaxed hovering state). Therefore, according to various example embodiments, the flight controller is configured to determine the right or target torque and the right or target heading angle.

Various example embodiments note that as the gyroscope rotates at high speed, the force components parallel to gyroscope plane ($u_x$, $u_y$) have limited impact on the translational dynamic as they remains near-zero on average over a cycle. Therefore, various example embodiments take only the force components parallel to $u_z$ into consideration when studying the translational dynamics. Suppose the total force acting on body fixed frame of gyroscope to be $F_{gyro}$, then according to various example embodiments, its translational dynamics can be calculated by:

$$m\ddot{p}=[0_{3\times1}\ 0_{3\times1}\ u_z]F_{gyro}-mge_3.$$ (Equation 18)

In order to apply Equation (18) into controlling M-SAMs, various example embodiments identify or determine how $F_{gyro}$ is generated. Let $F_i$ represent the total force acting on the ith robot (ith M-SAM) in its body fixed frame. Various example embodiments note that as a result of the small angle assumption of $\xi_x$ and $\xi_y$, $u_z$ is nearly upright. Therefore, various example embodiments use the projection of $F_i$ in the world frame to determine or approximate $F_{gyro}$, which in gyroscope's frame, may be determined or estimated as $F_{gyro} \approx \Sigma R_i F_i$. Accordingly, combining Equations (17) and (18), the reduced dynamics of the M-SAM is obtained according to various example embodiments of the present invention.

Accordingly, the reduced dynamics of the M-SAM includes both the torque $\hat{\tau}$ and the force $F_{gyro}$ as described hereinbefore with reference to Equations 17 and 18, respectively, according to various example embodiments of the present invention. The reduced torque model has also been described hereinbefore. In the reduced force model (see Equation (18)), according to various example embodiments, the collective forces generated by monocopters are simplified to be along the rotating axis $u_z$ (i.e., the z-axis of the gyroscope) because the forces along x-axis and y-axis of the gyroscope are cancelled with each other over a cycle. In other words, with the reduced dynamics, there is only one force vector along its z direction. For better understanding of the reduced force model, the monocopter(s) are treated as a rotating object with a force vector along its rotating axis, according to various example embodiments of the present invention, that is, only the force along the rotating axis is considered in the position control and other forces are assumed to be zero on average in a rotation cycle. This advantageously enables the dynamic modelling of both the singular and cooperative configurations using the same reduced dynamic model, and as a result, a simple PID (proportional-integral-derivative) based cascaded controlling strategy may be developed for both the singular and cooperative configurations according to various example embodiments of the present invention.

In order to move towards to a desired direction, there needs to be some force component according to Newton's second law. To achieve this, according to various example embodiments, the robot (monocopter(s)) needs to tilt its rotating axis ($u_z$) to the desired or target direction, represented by $\xi_x$ and $\xi_y$ (i.e., angular deviations in the x-axis and the y-axis with respect to the world frame as shown in FIG. 7). In order to simplify the consideration, various example embodiments limit the angular deviations $\xi_x$ and $\xi_y$ to small angles. In this way, $u_z$ is still approximately parallel to upright direction (z-axis in the inertia frame). As a result, the force projection in the inertia frame can be approximated or estimated as the force ($F_{gyro}$) in the gyroscope frame. This small angle assumption is valid or applicable to both the singular and cooperative configurations. It will be appreciated by a person skilled in the art that the present invention is not limited to any particular or specific small angle for the angular deviations $\xi_x$ and $\xi_y$, and the small angle may be controlled or set as desired or as appropriate, such as not more than 10 degrees.

For better understanding, the reduced dynamics and relaxed hovering condition will now be further described according to various example embodiments of the present invention. The reduced dynamics is based on the relaxed hovering condition. In the relaxed hovering condition, as explained hereinbefore, the torques applied on the body frame are all cancelled by each other, leaving only a constant rotating speed. In the relaxed hovering condition, the collective thrust generated by the monocopter(s) need to overcome the gravity in the inertia frame. With the self-rotating motion, as described hereinbefore, various example embodiments note that the robot can obtain same/similar properties like a gyroscope. Thus, various example embodiments introduce the reduced flight dynamics based on the relaxed hovering condition. With the reduced flight dynamics, as described hereinbefore, the robot is able to generate torque in arbitrary direction in the inertia frame over a rotation cycle, which is realized or implemented by pulsing the thrust unit (e.g. motor-propeller) at an appropriate or target heading angle (e.g., at a determined heading angle) with an appropriate or target magnitude (e.g., with a determined magnitude) in each rotation cycle of a plurality of rotation cycles. Furthermore, according to various example embodiments, the forces generated by the robot is simplified as a force vector along the rotating axis.

Accordingly, to move in a desired or target direction according to various example embodiments, the rotating axis of the robot is tilted slightly so that there is a force component in the horizontal direction to provide acceleration. In this regard, according to various example embodiments, the horizontal translational controller is configured to determine a target direction and a target amount of the tilt. The attitude controller is configured to determine a correct or target heading angle and a target amount to pulse the motor (e.g., by generating a cyclic signal configured to pulse the thrust unit at a determined heading angle of the monocopter and with a determined magnitude in each of a plurality of rotation cycles as will be described below according to various example embodiments). Furthermore, the altitude translational controller is configured to determine the rotating speed of the robot.

Controller Design

Figure 8:
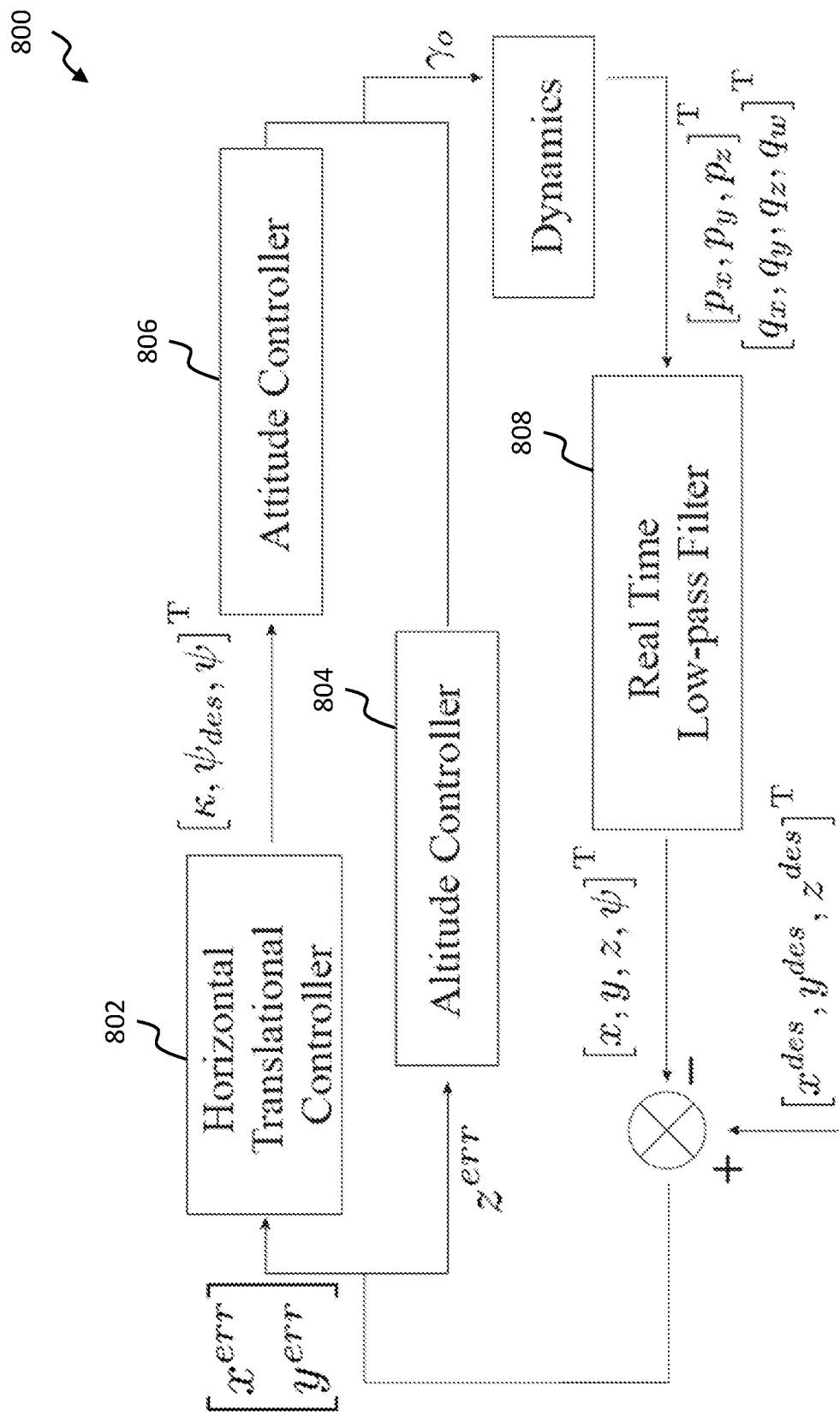
FIG. 8 depicts a schematic drawing of a flight controller, according to various example embodiments of the present invention.

For an underactuated system, controlling is one of the most challenging parts. In this regard, by regarding the robot (M-SAM) under the relaxed hovering condition as a gyroscope, various example embodiments are able to develop its reduced dynamics (as introduced in Equations (17) and (18)) for further designing the flight controller. To allow the robot to hover and track a desired path, the flight controller is configured to have a cascaded structure according to various example embodiments of the present invention. FIG. 8 depicts a schematic drawing of a flight controller 800 according to various example embodiments of the present invention (e.g., corresponding to the flight controller 106 as described hereinbefore according to various embodiments). The flight controller 800 comprises a translational controller 802 (or more particularly, a horizontal translation controller), an altitude controller 804, an attitude controller 806 and a dynamics and low-pass filter 808.

In FIG. 8, ($p_x$, $p_y$, $p_z$) and ($q_x$, $q_y$, $q_z$, $q_w$) denote the position and quaternions, respectively. In various example embodiments, in the cooperative mode, the position and quaternions may denote the position and quaternions of the M-SAMs as a whole. In various other example embodiments, in the cooperative mode, the position and quaternions may denote the respective position and quaternions of the respective M-SAM of the cooperative M-SAMs. In various example embodiments, the position and quaternions may denote the respective position and heading angle of the respective M-SAM in the inertial frame. In various example embodiments, the flight controller 800 may require the position and the heading angle in the specified coordination. For example, in experiments carried out indoor as will be described later below, the quaternion may be used to denote the attitude feedback. In this regard, quaternions may usually refer to the full attitude (or full attitude information) of a robot (such as roll, pitch and yaw) but in the control of the M-SAM (for both configurations) according to various example embodiments, only the feedback of the heading angle (e.g., similar to yaw) is used (i.e., instead of using the full attitude of the M-SAM). For example, this angle can be easily measured by various types of sensors such as a compass. This is an advantage of the M-SAM (in both configuration, comparing to other types of robot or controller which requires full attitude feedback) as full attitude estimation usually requires extra sensors such as IMU (inertia measurement unit). In various example embodiments, the higher level section of the flight controller 800 is a PID-based position controller (comprising the translation controller 802 and the altitude controller 804) to minimize the position error in a 3D space. The lower level section is a cyclic-based attitude controller 806 to change and maintain the attitude of the gyroscope (based on which the flight dynamics of the M-SAM is modelled) according to the output of higher level section of the flight controller 800.

Position Control

The position controller (e.g., corresponding to the position controller 306 as described hereinbefore according to various embodiments of the present invention) comprises the translational controller 802 and altitude controller 804. The position error in the x-y plane may be defined by vector $$p_{x,y}^{err} = [p_x^{err}, p_y^{err}]^T$$

(e.g., corresponding to the first position error in a first direction and the second position error in a second direction in the 3D space as described hereinbefore according to various embodiments of the present invention, the first and second directions being along a horizontal plane). To eliminate or minimize the position error, according to various example embodiments, the desired or target acceleration generated by the translational controller 802 may be determined as:

$$\kappa = k_{p,t}|p_{x,y}^{err}| - k_{d,t}|\dot{p}_{x,y}^{err}|, \quad \text{(Equation 19)}$$

with a desired or target direction of $$\psi_{des} = \text{atan2}\left(p_x^{err}, p_y^{err}\right), \quad \text{(Equation 20)}$$

where $k_{p,t}$ and $k_{d,t}$ is the controller gain.

Accordingly, in various example embodiments, the desired or target acceleration (k) and the desired or target direction ($\psi_{des}$) may be computed or determined according to Equations (19) and (20), respectively. In other words, in various example embodiments, the desired or target acceleration (k) and the desired or target direction ($\psi_{des}$) may be determined based on the position error from the difference of current position and velocity and the desired or target position and velocity. With the desired or target acceleration (k) and the desired or target direction ($\psi_{des}$) from the translation controller 802, the attitude controller 804 generates a command or control signal (or a component of a command or control signal) for the thrust unit (motor-propeller) based on Equation (22) (to be described below), which may be in the form of a cyclic signal.

Let the altitude error be $p_z^{err}$, according to various example embodiments, then the altitude controller 804 may be configured as a standard PID format and may be written as:

$$a_z^{des} = k_{p,a} p_z^{err} + k_{i,a} \int_0^t p_z^{err} dt + k_{d,a} \frac{dp_z^{err}}{dt} \quad \text{(Equation 21)}$$

where $a_z^{des}$ is the desired acceleration in the z-axis of the world frame, $k_{p,a}$, $k_{i,a}$ and $k_{d,a}$ are corresponding controller gain.

As described hereinbefore, the desired acceleration ($a_z^{des}$) in the z-axis is mainly caused by the lift force of the wing, which is mainly decided by the rotation speed of the robot, $\omega$.

Accordingly, in various example embodiments, the position controller comprises a translational controller 802 configured to determine a target acceleration in a target direction based on a first position error (e.g., $p_x^{err}$) in a first direction (along the x-axis) and a second position error (e.g., $p_y^{err}$) in a second direction (along the y-axis) in a 3D space, the first and second directions being along a horizontal plane (e.g., the x-y plane); and an altitude controller 804 configured to determine a target acceleration in a third direction (along the z-axis) perpendicular to the horizontal plane based on a third position error ($p_z^{err}$) in the third direction in the 3D space.

Attitude Control

In various example embodiments, the attitude controller 806 aims to stabilize the flight and generate the desired attitude commanded by translational controller 802. Limited by high underactuation and complexity of the system, various example embodiments found that the attitude of the gyroscope cannot be simultaneously and completely tracked since the torque is generated cyclically. To address this technical problem and to simplify the consideration, various example embodiments presume that the response speed of propeller is much faster than the attitude dynamics of robot. By rapidly changing motor speed, various example embodiments found that the torque generated by precession motion is larger than the torque produced by aerodynamic force at this moment, leaving a unbalanced torque acting on the x-axis in the body fixed frame of the robot (see Equation (6)). To cyclically produce this torque, various example embodiments use a cosine function, which may be expressed as:

$$\gamma = \kappa \cos(\psi - \psi_{des} + \psi_o), \quad \text{(Equation 22)}$$

where $\gamma$ is the commanding signal for actuator, $\kappa$ and $\psi_{des}$ are provided by translational controller 802, $\psi$ is a heading angle (e.g., a current or detected heading angle) of the robot and $\psi_o$ is an offset. To further explain, various example embodiments use $\Delta\tau$ to approximate the integration of torque $\delta\tau$ generated by Equation (22) over a cycle, as $\Delta\tau \approx \int_t^{t+T} \delta\tau dt$. By replacing $\hat{\tau}$ with $\Delta\tau$ and substituting $\hat{\psi}$ into Equation (17), the cyclic small attitude deviation ($\Delta\xi_x$, $\Delta\xi_y$) is produced by the flight controller 800. Since the robot revolves at a high speed in the flight, the commanded attitude angle can then be sufficiently tracked.

For example, as described hereinbefore, Equation (17) shows that the torque can be generated in the inertia frame by pulsing motor at a proper or target heading angle. Accordingly, Equation (22) generates a cyclic signal ($\gamma$) for controlling the motor for driving the propeller based on the desired or target acceleration ($\kappa$) and the desired or target direction ($\psi_{des}$). In various example embodiments, as shown in Equation (22), the cyclic signal is generated further based on the current or detected heading angle ($\psi$) of the monocopter. This ensures that the torque is generated at the target direction ($\psi_{des}$). Accordingly, in various example embodiments, the attitude controller 806 is configured generate a target attitude signal based on the target acceleration in the target direction from the translational controller 802, which may be in the form of a cyclic signal (e.g., Equation (22)) configured to pulse the thrust unit at a determined heading angle of the monocopter and with a determined magnitude in each of a plurality of rotation cycles.

Accordingly, combining Equations (19), (20), (21), (22) together, the full controller $\gamma_o = a_z^{des} + \gamma$ is obtained, according to various example embodiments of the present invention. By way of an illustrative example and without limitation, for an implementation in an indoor environment based on a motion capture system, the flight controller 800 receives a position feedback and a heading angle feedback in real time with respect to the coordinates of the motion capture system. Comparing a target or desired position to the actual position from the motion capture system, the position errors (e.g., $p_x^{err}$, $p_y^{err}$, $p_z^{err}$ (or $x^{err}$, $y^{err}$, $z^{err}$ as shown in FIG. 8)) are determined. To eliminate or minimize the position error, the horizontal translational controller 802 determines the target acceleration ($\kappa$) and the target direction ($\psi_{des}$). Subsequently, in order to realise the target acceleration in the target direction, the attitude controller 806 generates a cyclic signal ($\gamma$) for controlling the actuator (motor-propeller).

Accordingly, the cyclic signal is configured to push the robot to tilt to the target direction. At the same time, the altitude controller 804 computes a target acceleration along the z-axis (i.e., height or altitude of flight). To generate the target acceleration in height, the robot is configured to rotate faster or slower. Therefore, according to various example embodiments, the command or control signal ($\gamma_o$) for the motor for driving the propeller comprises two components, a first component ($\gamma$) is the cyclic signal from the attitude controller 806 to eliminate or minimize the position error along a horizontal plane (e.g., x-y plane) and a second component ($a_z^{des}$) is from the altitude controller 804 (or more particularly, altitude translational controller) to eliminate or minimize the height error. Therefore, $\gamma$ denotes the cyclic signal, $\kappa$ and $\psi_{des}$ respectively denote the desired or target acceleration and the desired or target direction in the horizontal plane, and do denotes a constant parameter caused by signal transmitting delay and response delay of the actuator (the motor for driving the propeller). Let $a_z^{des}$ denote the target or desired acceleration in height, $\psi$ is the heading angle of the robot received from (or detected by) the motion capture system (computed from quaternions), the command or control signal for controlling the motor may be expressed as, $$\gamma_o = a_z^{des} + \gamma \cos(\psi - \psi_{des} + \psi_o). \quad \text{(Equation 23)}$$

Therefore, according to various example embodiments, the motor control signal has a similar format as a general cosine function, with $a_z^{des}$ being the vertical shift and $\gamma$ being the amplitude. For the cooperative mode, the $\psi_o$ for each cooperative monocopter may be different and depends on the setup implemented. But since they are a constant value, it is not necessary to take it into consideration for the flight controller design.

Implementation Consideration

Various example embodiments note that, when M-SAMs translate laterally through the air, the advancing wing blade may experience a higher air velocity. As a result, an unexpected force and torque may be produced due to the translational motion. For M-SAMs, especially in cooperative mode, this torque may seriously affect the tracking performance. In order to minimise these impacts, various example embodiments limit the translational speed to ensure the tracking accuracy in real flight. Thus, in various example embodiments, an output of the position controller, $\kappa$, may be modified to be a saturated function.

Furthermore, in various example embodiments, when applying the attitude controller 806 described by Equation (22) into the cooperative configuration, an extra offset parameter $\psi_{eo}$ may be introduced according to the amount of units, given as $$\psi_{eo} = \frac{2\pi}{n}.$$

Accordingly, in various example embodiments, the attitude controller 806 for the ith M-SAM may be modified to generate the cyclic signal as $\gamma_i = \kappa \cos(\psi - \psi_{des} + \psi_o + i\psi_{eo})$.

Experiment Validation

The flight controller 800 and the separation mechanism in flight according to various example embodiments will now be evaluated and validated using two example M-SAM prototypes.

M-SAM Prototype

FIG. 9 depicts a schematic drawing of an example M-SAM 902 according to various example embodiments of the present invention (e.g., corresponding to the monocopter 102 as described hereinbefore according to various embodiments of the present invention) in the singular mode (left side of FIG. 9) and in the cooperative mode with another same M-SAM 900 (i.e., a multi-monocopter system 900 made up of two M-SAMs, as shown in the right side of FIG. 9).

As can be seen in FIG. 9, the multi-monocopter system 900 comprises: a plurality of monocopters 902 operable cooperatively in a cooperative flight mode (right side of FIG. 9) and operable individually in an individual flight mode (left side of FIG. 9). For the sake of simplicity and clarity, the multi-monocopter system 200 is shown in FIG. 2 as having two monocopters 902. However, as explained hereinbefore, it will be appreciated by a person skilled in the art that the present invention is not limited to a multi-monocopter system 900 having only two monocopters and any number of multiple monocopters can be included in the multi-monocopter system 900 as desired or as appropriate without going beyond the scope of the present invention.

In various example embodiments, each monocopter 902 comprises a housing member 904 having disposed thereon a flight controller 800 (e.g., corresponding to the flight controller 106 as described hereinbefore according to various embodiments) operable to control a flight of the monocopter 902 in the individual flight mode and control a flight of the plurality of monocopters collectively in the cooperative flight mode. Each monocopter 902 further comprises a wing member 910 coupled to the housing member 904 so as to extend from a first side 912 thereof, the wing member 910 being configured to produce an aerodynamic force when the monocopter 902 is rotating; and a thrust unit 914 coupled to a leading edge 916 of the wing member 910 and configured to generate a thrust for rotating the monocopter 902. In this regard, the flight controller 800 is communicatively coupled to the thrust unit 914 for controlling the thrust unit 914. Each monocopter 902 further comprises a magnetic connector 918 coupled to the housing member 904 so as to extend from a second side 920 thereof, the second side 920 being at least substantially opposite to the first side 912 of the housing member 904, the magnetic connector 918 being configured to be connectable to one or more corresponding magnetic connectors 918 of other one or more monocopters 902 of the plurality of monocopters via a magnetic force to operate cooperatively in the cooperative flight mode with the above-mentioned other one or more monocopters 902. In particular, when the plurality of monocopters are operating cooperatively in the cooperative flight mode during flight, the flight controller 800 is operable to control the rotational speed of the plurality of monocopters collectively to produce a centrifugal force that exceed the above-mentioned magnetic force for separating the plurality of monocopters connected via the above-mentioned magnetic force so as to convert (or switch) the cooperative flight mode to the individual flight mode.

In various example embodiments, as can be seen from FIG. 9, the flight controller 800 and the magnetic connector 918 are each positioned to have a respective offset from the leading edge 916 of the wing member 910 in a direction at least substantially opposite to a direction of the thrust configured to be generated by the thrust unit 914. As an example illustration, the offset 940 of the magnetic connector 918 from the leading edge 916 of the wing member 910 is shown in FIG. 9.

In various example embodiments, the housing member 904 has further disposed thereon: a speed controller (e.g., electronic speed controller) 924 communicatively coupled to the flight controller 800 and the thrust unit 914; and a power source 926 configured to power the flight controller 800, the speed controller 924 and the thrust unit 914. In various embodiments, the flight controller 800 is operable to control the thrust unit 914 via the speed controller 924. Furthermore, the speed controller 924 and the power source 926 are each positioned to have a respective offset from the leading edge 916 of the wing member 910 in the direction at least substantially opposite to the direction of the thrust configured to be generated by the thrust unit. Accordingly, the flight controller 800, the speed controller 924, the power source 926 and the magnetic connector 918 each has a respective offset from the leading edge 916 of the wing member 910.

In various example embodiments, the wing member 910 comprises an airframe 928 configured to have a general L-shape and the wing member 910 is coupled to the housing member 904 via the airframe 928 such that the flight controller 800 and the magnetic connector 918 are each positioned to have the respective offset from the leading edge 916 of the wing member 910. For example, as shown in FIG. 9, the main wing portion may be affixed to and held by the airframe 928.

In various example embodiments, as shown in FIG. 9, the thrust unit 914 is coupled to the leading edge 916 of the wing member 910 at a distal end portion thereof and is configured to generate the thrust in a direction at least substantially perpendicular to the leading edge 916 of the wing member 910 and substantially along a plane of the wing member 910.

In various example embodiments, the magnetic connector 918 comprises a magnetic protruding portion 930 configured for connecting to the above-mentioned one or more corresponding magnetic connectors 918 of the above-mentioned other one or more monocopters 902 of the plurality of monocopters via the above-mentioned magnetic force.

In various example embodiments, the thrust unit 914 comprises a propeller 932 and a motor 934 configured to rotate the propeller 932.

By way of implementation examples only and without limitations, the flight controller 800 may be implemented by a flight control board, such as but not limited to, Crazyflie Bolt. The motor 934 may be a 5500 KV brushless motor (e.g., FLYWOO ROBO), matched with a propeller 932 with the radius of 40 mm. To drive the brushless motor 934, a 35 A, 2-5 s electronic speed controller (ESC) (e.g., HAKRC) 924 and a 300 mAh, 2 s Li—Po battery (e.g., BETAFPV) 926 may be provided. For example, the robot's frame and the non-magnetic component of the magnetic connector 918 may be modelled by CAD software (e.g., SOLIDWORKS) and printed (i.e., integrally formed) by a 3D printer (e.g., Markforged). The model number of magnet may be D71 from K&J Magnetics. The main wing portion may be fabricated by a piece of laminated wood (e.g., 260 mm×80 mm×1 mm). For such an example singular M-SAM prototype 902, its total mass may be around 80 grams. It will be appreciated by a person skilled in the art that the present invention is not limited to such implementation examples and various configurations (e.g., dimensions) may be modified or optimized as desired or as appropriate without going beyond the scope of the present invention.

Experimental Setup

Flight experiments were conducted in an indoor environment with a 7.5×6×2.6 meter arena equipped with 15 cameras to measure the position and attitude of the robot. For experimental purposes only, the flight controller 800 was implemented on a laptop computer under python environment at a frequency of 180 Hz. The communication between the robot (i.e., the M-SAM(s)) and computer was based on wireless communication, such as using Crazyradio PA. Since the robot revolves at high angular velocity, the communication latency causes non-negligible impact on the flight controller 800. To minimize the impact, an offset parameter $\psi_o$ is introduced in Equation (22).

According to various example embodiments, even though the flight controller 800 for the M-SAM in singular and cooperative mode has the same structure, corresponding parameters in the singular and cooperative modes may have a different value. As an example, the offset $\psi_o$ is related to the delay of the signal transmitting and different rotating speed leads to different value of $\psi_o$. In this regard, according to various example embodiments, the cooperative mode rotates slower than the singular mode due to the difference in effective wing area, thus resulting in different rotating speed between the singular and cooperative modes. To achieve a better control performance, values of certain gains in the flight controller 800 may also be adjusted accordingly, which may result in different values between the singular and cooperative modes.

In order to assign matched parameters, the robots (M-SAMs) need to know their current flight mode. In various example embodiments, the current flight mode may be detected by measuring the relative distance of M-SAMs via the position feedback of motion capture system.

Flight Experiments

To evaluate the flight controller 800 for the M-SAMs 902 in both configuration and the separation mechanism, several flight experiments were conducted for hovering, following a planned path and separating in mid-air.

Figures 10, 11:
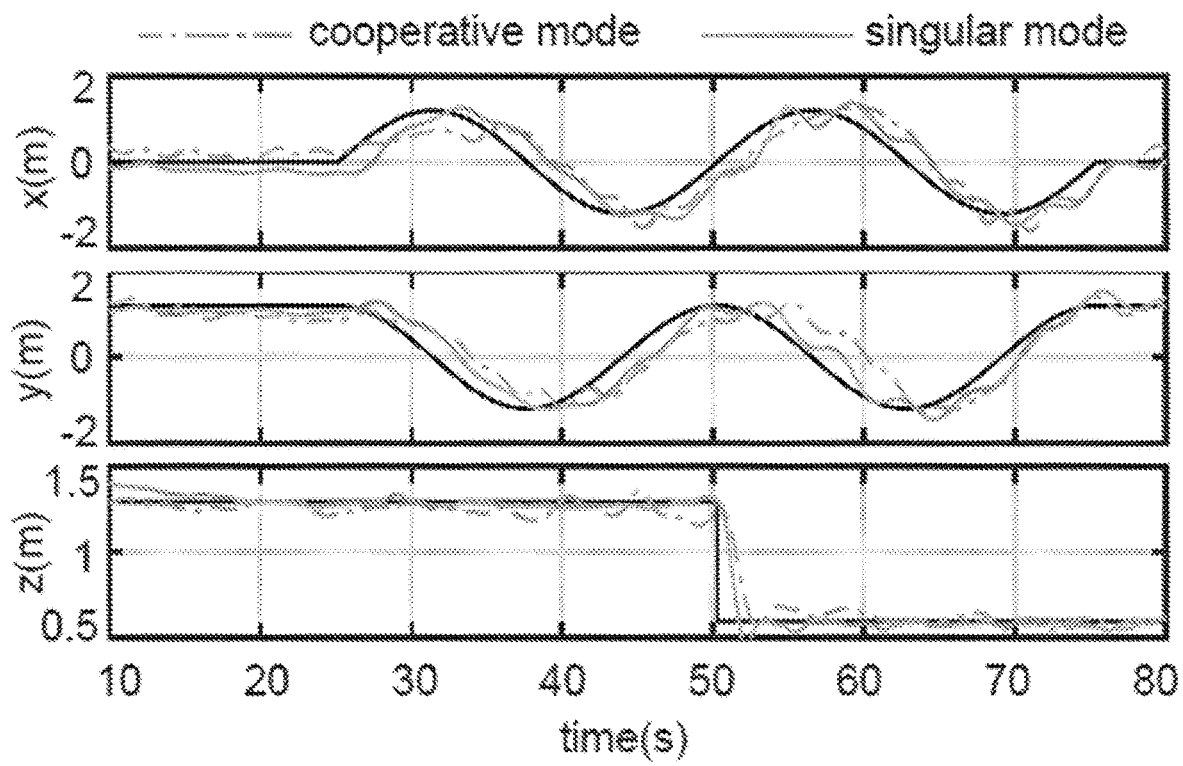
FIG. 10 shows a table (Table I) presenting the root mean square error (RMSE) of the position for both hovering and tracking calculated from 5 flights in the singular and cooperative modes, according to various example embodiments of the present invention.
FIG. 11 shows plots of the measured flight trajectories of the M-SAM in the singular and cooperative modes, according to various example embodiments of the present invention.

1) Singular M-SAM flight: To demonstrate the performance of the flight controller 800, a simple 80 seconds trajectory was developed that includes hovering and tracking a circle with a radius of 1.2 meters. FIG. 11 show a plot of the measured flight trajectory of the M-SAM 902 in the singular mode, whereby the dark black lines are provided as a reference. Root mean square error (RMSE) of the position for both hovering and tracking were also calculated from 5 flights in the singular mode and presented in Table I shown in FIG. 10.

2) Cooperative M-SAMs flight: To form the cooperative mode, two M-SAMs 900 were connected by corresponding magnetic connectors 918 as shown in FIG. 9B. The relative angle between each unit was 30 degrees. Same trajectory as described above for the singular M-SAM flight was produced to test the flight controller 800. FIG. 11 also show a plot of the measured flight trajectory of the M-SAMs 900 in the cooperative mode. RMSE of the position for both hovering and tracking were also calculated from 5 flights in the cooperative mode and presented in Table I shown in FIG. 10.

Figure 12:
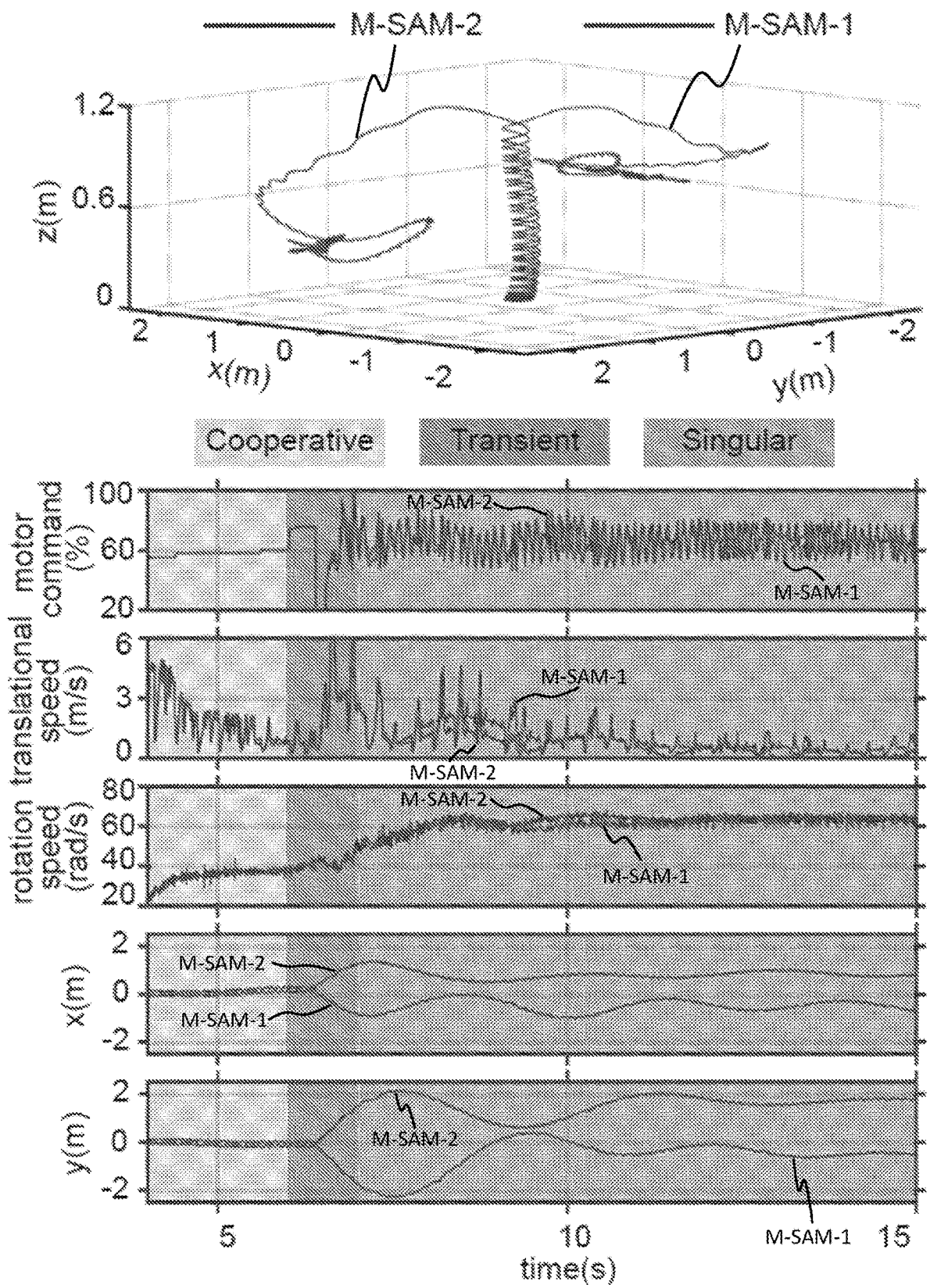
FIG. 12 depicts a plot showing the trajectories of two M-SAMs separating from the cooperative mode to the singular mode, as well as five plots respectively indicating the motor commands, translational speed, rotating speed, x position and y position of each M-SAM, according to various example embodiments of the present invention.

3) Separating in mid-air: To further confirm the capacity of flight controller 800 and test the passive detachment, a mid-air separating experiment was arranged. For safety, M-SAMs 900 in cooperative mode was controlled by a human pilot with a remote transmitter. By manually sending commands to each M-SAM, the revolving speed can be controlled to trigger the separation condition. After the separating, each M-SAM 902 was controlled by a position-free controller with the purpose of eliminating the high velocity (around 5 m/s) due to the disassembly. The revolving speed of M-SAMs 902 in cooperative mode was around 35 rad/s. After increasing to around 45 rad/s, M-SAMs 902 disassembled into singular mode. FIG. 12 shows the separation of the M-SAMs 902 to convert or switch from the cooperative configuration into the singular configuration. The top plot in FIG. 12 shows the trajectories of two M-SAMs 902 separating from the cooperative mode to the singular mode. The lower five plots in FIG. 12 indicate the motor commands, translational speed, rotating speed, x position and y position of each M-SAM.

As a severely underactuated system, the flight performance may be limited to near-hovering motion. Nevertheless, the flight controller 800 was evaluated by conducting several hovering and low-speed (around 0.2 m/s) trajectory tracking flights. By comparing the normalized thrust consumption of motor thrust in each configuration/mode, it was also roughly verify that the cooperative configuration (60%) consuming around 7% less thrust than singular configuration (67%) to each unit.

Accordingly, various example embodiments provide a M-SAM 902 which can fly in both singular and cooperative modes. By deriving the reduced dynamics for both singular and cooperative modes, a generalised flight controller 800 with cascaded structure was designed according to various example embodiments of the present invention. By arranging several experiments in singular mode, cooperative mode and mid-air separating, the capacity of flight controller 800 was evaluated. The experimental results show that the M-SAMs 902 can achieve controlled flight in each configuration/mode, assembled into cooperative mode with simple human assistance, then perform a controlled passive separation into singular mode in mid-air.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A multi-monocopter system comprising:
   a plurality of monocopters operable cooperatively in a cooperative flight mode and operable individually in an individual flight mode, each monocopter comprising:
      a housing member having disposed thereon a flight controller operable to control a flight of the monocopter in the individual flight mode and a flight of the plurality of monocopters collectively in the cooperative flight mode;
      a wing member coupled to the housing member so as to extend from a first side thereof, the wing member being configured to produce an aerodynamic force when the monocopter is rotating;
      a thrust unit coupled to a leading edge of the wing member and configured to generate a thrust for rotating the monocopter, wherein the flight controller is communicatively coupled to the thrust unit for controlling the thrust unit; and
      a magnetic connector coupled to the housing member so as to extend from a second side thereof, the second side being at least substantially opposite to the first side of the housing member, the magnetic connector being configured to be connectable to one or more corresponding magnetic connectors of other one or more monocopters of the plurality of monocopters via a magnetic force to operate cooperatively in the cooperative flight mode with said other one or more monocopters,
   wherein when the plurality of monocopters are operating cooperatively in the cooperative flight mode during flight, the flight controller is operable to control a rotational speed of the plurality of monocopters collectively to produce a centrifugal force that exceed said magnetic force for separating the plurality of monocopters connected via said magnetic force so as to convert the cooperative flight mode to the individual flight mode.

2. The multi-monocopter system according to claim 1, wherein the flight controller and the magnetic connector are each positioned to have a respective offset from the leading edge of the wing member in a direction at least substantially opposite to a direction of the thrust configured to be generated by the thrust unit.

3. The multi-monocopter system according to claim 2, wherein the housing member has further disposed thereon:
   a speed controller communicatively coupled to the flight controller and the thrust unit, wherein the flight controller is operable to control the thrust unit via the speed controller; and
   a power source configured to power the flight controller, the speed controller and the thrust unit, and
   wherein the speed controller and the power source are each positioned to have a respective offset from the leading edge of the wing member in the direction at least substantially opposite to the direction of the thrust configured to be generated by the thrust unit.

4. The multi-monocopter system according to claim 2, wherein the wing member comprises an airframe configured to have a general L-shape and the wing member is coupled to the housing member via the airframe such that the flight controller and the magnetic connector are each positioned to have the respective offset from the leading edge of the wing member.

5. The multi-monocopter system according to claim 1, wherein the thrust unit is coupled to the leading edge of the wing member at a distal end portion thereof and is configured to generate the thrust in a direction at least substantially perpendicular to the leading edge of the wing member and at least substantially along a plane of the wing member.

6. The multi-monocopter system according to claim 1, wherein the magnetic connector comprises a magnetic protruding portion configured for connecting to said one or more corresponding magnetic connectors of said other one or more monocopters of the plurality of monocopters via said magnetic force.

7. The multi-monocopter system according to claim 1, wherein said each of the plurality of monocopters is a single actuator monocopter.

8. The multi-monocopter system according to claim 1, wherein the flight controller is configured to control the flight of the monocopter in the individual flight mode and control the flight of the plurality of monocopters collectively in the cooperative flight mode based on a reduced flight dynamic model, the reduced dynamic model being configured to approximate an individual flight dynamic of the monocopter in the individual flight mode based on a gyroscope model of the monocopter in the individual flight mode and approximate a cooperative flight dynamic of the plurality of monocopters collectively in the cooperative flight mode based on a gyroscope model of the plurality of monocopters collectively in the cooperative flight mode.

9. The multi-monocopter system according to claim 8, wherein
   the gyroscope model of the monocopter in the individual flight mode is configured based on a relaxed hovering condition of the monocopter in the individual flight mode, and
   the gyroscope model of the plurality of monocopters collectively in the cooperative flight mode is configured based on a relaxed hovering condition of the plurality of monocopters collectively in the cooperative flight mode.

10. The multi-monocopter system according to claim 8, wherein the flight controller comprises:
a position controller comprising:
a translational controller configured to determine a target acceleration in a target direction based on a first position error in a first direction and a second position error in a second direction in a 3D space, the first and second directions being along a horizontal plane; and
an altitude controller configured to determine a target acceleration in a third direction perpendicular to the horizontal plane based on a third position error in the third direction in the 3D space; and
an attitude controller configured to generate a target attitude signal based on the target acceleration in the target direction from the translational controller.

11. The multi-monocopter system according to claim 10, wherein the flight controller is configured to control the flight of the monocopter in the individual flight mode and the flight of the plurality of monocopters collectively in the cooperative flight mode based on controlling the thrust unit to generate the thrust based on the target attitude signal and the target acceleration in the third direction.

12. The multi-monocopter system according to claim 10, wherein the target attitude signal generated by the attitude controller is a cyclic signal configured to pulse the thrust unit at a determined heading angle of the monocopter and with a determined magnitude in each of a plurality of rotation cycles.

13. A method of operating the multi-monocopter system according to claim 10, wherein the plurality of monocopters are operating cooperatively in the cooperative flight mode, the method comprising:
receiving, by the flight controller of each monocopter of the plurality of monocopters, a target position in a 3D space;
determining, by the flight controller of each monocopter of the plurality of monocopters, a first position error in a first direction, a second position error in a second direction and a third position error in a third direction of the plurality of monocopters collectively in the 3D space based on the target position and a current position in the 3D space, the first and second directions being along a horizontal plane and the third direction being perpendicular to the horizontal plane;
determining, by the translational controller of the position controller of each monocopter of the plurality of monocopters, a respective target acceleration in a target direction for the respective monocopter based on the first and second position errors;
determining, by the altitude controller of the position controller of each monocopter of the plurality of monocopters, a respective target acceleration in the third direction for the respective monocopter based on the third position error; and
generating, by the attitude controller of each monocopter of the plurality of monocopters, a target attitude signal for the respective monocopter based on the respective target acceleration in the target direction from the translation controller of the respective monocopter; and
generating, by the thrust unit of each monocopter of the plurality of monocopters, the respective thrust based on the respective target attitude signal and the respective target acceleration in the third direction determined for moving the plurality of monocopters collectively.

14. The method according to claim 13, further comprising receiving, by the flight controller of each monocopter of the plurality of monocopters, a target rotational speed for controlling the rotational speed of the plurality of monocopters collectively to produce a centrifugal force that exceed said magnetic force for separating the plurality of monocopters connected via said magnetic force so as to convert the cooperative flight mode to the individual flight mode.

15. The method according to claim 14, wherein the plurality of monocopters are operating individually in the individual flight mode, the method comprising:
receiving, by the flight controller of each monocopter of one or more monocopters of the plurality of monocopters, a respective target position of the respective monocopter in the 3D space;
determining, by the flight controller of each monocopter of said one or more monocopters of the plurality of monocopters, a respective first position error in a first direction, a respective second position error in a second direction and a respective third position error in a third direction of the respective monocopter in the 3D space based on the respective target position and a respective current position of the respective monocopter in the 3D space, the first and second directions being along a horizontal plane and the third direction being perpendicular to the horizontal plane;
determining, by the translational controller of the position controller of each monocopter of said one or more monocopters of the plurality of monocopters, a respective target acceleration in a target direction for the respective monocopter based on the respective first and second position errors;
determining, by the altitude controller of the position controller of each monocopter of said one or more monocopters of the plurality of monocopters, a respective target acceleration in the third direction for the respective monocopter based on the respective third position error; and
generating, by the attitude controller of each monocopter of said one or more monocopters of the plurality of monocopters, the respective target attitude signal for the respective monocopter based on the respective target acceleration in the target direction from the respective translation controller; and
generating, by the thrust unit of each monocopter of said one or more monocopters of the plurality of monocopters, the respective thrust based on the respective target attitude signal and the respective target acceleration in the third direction determined for moving the respective monocopter individually to the respective target position.

16. A method of forming a monocopter for a multi-monocopter system comprising a plurality of monocopters operable cooperatively in a cooperative flight mode and operable individually in an individual flight mode, the method comprising:
providing or forming a housing member and disposing thereon a flight controller operable to control a flight of the monocopter in the individual flight mode and a flight of the plurality of monocopters collectively in the cooperative flight mode;
providing or forming a wing member coupled to the housing member so as to extend from a first side thereof, the wing member being configured to produce an aerodynamic force when the monocopter is rotating;

coupling a thrust unit to a leading edge of the wing member and configured to generate a thrust for rotating the monocopter, wherein the flight controller is communicatively coupled to the thrust unit for controlling the thrust unit; and providing or forming a magnetic connector coupled to the housing member so as to extend from a second side thereof, the second side being at least substantially opposite to the first side of the housing member, the magnetic connector being configured to be connectable to one or more corresponding magnetic connectors of other one or more monocopters of the plurality of monocopters via a magnetic force to operate cooperatively in the cooperative flight mode with said other one or more monocopters, wherein when the plurality of monocopters are operating cooperatively in the cooperative flight mode during flight, the flight controller is operable to control a rotational speed of the plurality of monocopters collectively to produce a centrifugal force that exceed said magnetic force for separating the plurality of monocopters connected via said magnetic force so as to convert the cooperative flight mode to the individual flight mode.

17. The method according to claim 16, wherein the flight controller and the magnetic connector are each positioned to have a respective offset from the leading edge of the wing member in a direction at least substantially opposite to a direction of the thrust configured to be generated by the thrust unit.

18. The method according to claim 17, wherein the housing member has further disposed thereon:
   a speed controller communicatively coupled to the flight controller and the thrust unit, wherein the flight controller is operable to control the thrust unit via the speed controller; and
   a power source configured to power the flight controller, the speed controller and the thrust unit, and
   wherein the speed controller and the power source are each positioned to have a respective offset from the leading edge of the wing member in the direction at least substantially opposite to the direction of the thrust configured to be generated by the thrust unit.

19. The method according to claim 17, wherein the wing member comprises an airframe configured to have a general L-shape and the wing member is coupled to the housing member via the airframe such that the flight controller and the magnetic connector are each positioned to have the respective offset from the leading edge of the wing member.

20. The method according to claim 16, wherein the magnetic connector comprises a magnetic protruding portion configured for connecting to said one or more corresponding magnetic connectors of said other one or more monocopters of the plurality of monocopters via said magnetic force.

* * * * *